US011118779B2

(12) United States Patent
Spencer et al.

(10) Patent No.: US 11,118,779 B2
(45) Date of Patent: Sep. 14, 2021

(54) LUMINAIRE WITH AN INTEGRATED SPEAKER

(71) Applicant: ABL IP Holding LLC, Atlanta, GA (US)

(72) Inventors: Charles Jeffrey Spencer, Wilmette, IL (US); Daniel Francis Posacki, Wheaton, IL (US); Kyle Michael Bradd, Park Ridge, IL (US); Gregory Philip Frankiewicz, Elmhurst, IL (US); Feng Chen, Hoffman Estates, IL (US); John Glenn Serra, Pingree Grove, IL (US); Darcie Renee Callison, Palatine, IL (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 16/659,341

(22) Filed: Oct. 21, 2019

(65) Prior Publication Data

US 2020/0124270 A1 Apr. 23, 2020

Related U.S. Application Data

(60) Provisional application No. 62/748,283, filed on Oct. 19, 2018, provisional application No. 62/748,248, (Continued)

(51) Int. Cl.
*F21V 33/00* (2006.01)
*F21V 8/00* (2006.01)
(Continued)

(52) U.S. Cl.
CPC ....... *F21V 33/0056* (2013.01); *F16M 13/027* (2013.01); *F21S 8/026* (2013.01); (Continued)

(58) Field of Classification Search
CPC . F21V 33/0056; F21V 23/003; F16M 13/027; G02B 6/0066; G02B 6/0073;
(Continued)

(56) References Cited

U.S. PATENT DOCUMENTS

| 4,346,640 A | 8/1982 | Zeno et al. |
| 5,424,859 A | 6/1995 | Uehara et al. |

(Continued)

FOREIGN PATENT DOCUMENTS

| CN | 202735830 | 2/2013 |
| CN | 203193950 | 9/2013 |

(Continued)

OTHER PUBLICATIONS

Sung et al., Design and Implementation of a Smart LED Lighting System Using a Self Adaptive Weighted Data Fusion Algorithm, Sensors, vol. 13, No. 12, Dec. 2013, 25 pages.
(Continued)

*Primary Examiner* — Bryon T Gyllstrom
*Assistant Examiner* — Christopher E Dunay
(74) *Attorney, Agent, or Firm* — Kilpatrick Townsend & Stockton LLP

(57) ABSTRACT

A luminaire includes a speaker positioned at a first depth within a luminaire housing and capable of generating an audio output from a speaker diaphragm. The luminaire also includes a light source that generates a light output. Further, the luminaire includes a light guide assembly positioned at a second depth within the luminaire housing different from the first depth. The light guide assembly includes an acoustically transparent area positioned along a sound path from the speaker diaphragm, and the light guide assembly extracts the light output from the light source and directs the light output away from the luminaire.

19 Claims, 19 Drawing Sheets

Related U.S. Application Data filed on Oct. 19, 2018, provisional application No. 62/748,268, filed on Oct. 19, 2018, provisional application No. 62/748,253, filed on Oct. 19, 2018.

(51) Int. Cl.

| | |
|---|---|
| *F16M 13/02* | (2006.01) |
| *H04R 1/02* | (2006.01) |
| *F21V 23/00* | (2015.01) |
| *H04R 7/12* | (2006.01) |
| *G09G 3/34* | (2006.01) |
| *H04R 3/12* | (2006.01) |
| *F21S 8/02* | (2006.01) |

(52) U.S. Cl.
CPC .......... *F21V 23/003* (2013.01); *G02B 6/0066* (2013.01); *G02B 6/0073* (2013.01); *G09G 3/3426* (2013.01); *H04R 1/025* (2013.01); *H04R 1/028* (2013.01); *H04R 3/12* (2013.01); *H04R 7/122* (2013.01)

(58) Field of Classification Search
CPC ...... G09G 3/3426; H04R 1/025; H04R 1/028; H04R 3/12; H04R 7/122
See application file for complete search history.

(56) References Cited

U.S. PATENT DOCUMENTS

| | | | |
|---|---|---|---|
| 6,000,493 A * | 12/1999 | Chen | H04R 1/028 181/141 |
| 6,343,135 B1 | 1/2002 | Ellero et al. | |
| 6,528,954 B1 | 3/2003 | Lys et al. | |
| 6,548,967 B1 | 4/2003 | Dowling et al. | |
| 6,748,096 B2 | 6/2004 | Chuang | |
| 7,162,258 B2 | 1/2007 | Beach et al. | |
| 7,446,671 B2 | 11/2008 | Giannopoulos et al. | |
| 7,741,782 B2 | 6/2010 | Vermeulen et al. | |
| 7,976,048 B2 | 7/2011 | Bartolome et al. | |
| 8,033,686 B2 | 10/2011 | Recker et al. | |
| 8,251,544 B2 | 8/2012 | Ivey et al. | |
| 8,282,227 B2 | 10/2012 | Massara et al. | |
| 8,445,826 B2 | 5/2013 | Verfuerth | |
| 8,476,565 B2 | 7/2013 | Verfuerth | |
| 8,586,902 B2 | 11/2013 | Verfuerth | |
| 8,628,216 B2 | 1/2014 | Ivey et al. | |
| 8,675,887 B2 | 3/2014 | Yuan et al. | |
| 8,731,689 B2 | 5/2014 | Platner et al. | |
| 8,829,821 B2 | 9/2014 | Chobot et al. | |
| 8,912,735 B2 | 12/2014 | Chobot et al. | |
| 8,981,646 B2 | 3/2015 | Kim | |
| 9,053,622 B2 | 6/2015 | Scalisi | |
| 9,081,269 B2 | 7/2015 | Conti | |
| 9,115,886 B2 | 8/2015 | Lam et al. | |
| 9,143,230 B2 | 9/2015 | Casaccia et al. | |
| 9,143,741 B1 | 9/2015 | Fu et al. | |
| 9,161,111 B2 | 10/2015 | Yuan et al. | |
| 9,163,816 B2 | 10/2015 | Baschnagel | |
| 9,172,917 B1 | 10/2015 | Fu et al. | |
| 9,267,675 B2 | 2/2016 | Wu | |
| 9,294,828 B2 | 3/2016 | Rutherford | |
| 9,303,863 B2 | 4/2016 | Vaidya | |
| 9,313,575 B2 | 4/2016 | Wang et al. | |
| 9,320,101 B2 | 4/2016 | Sun et al. | |
| 9,328,913 B2 | 5/2016 | Yotsumoto et al. | |
| 9,353,939 B2 | 5/2016 | Simon et al. | |
| 9,433,061 B2 | 8/2016 | Chobot | |
| 9,438,976 B2 | 9/2016 | Wang et al. | |
| 9,441,634 B2 | 9/2016 | Spiro | |
| 9,532,438 B2 | 12/2016 | Leung et al. | |
| 9,554,089 B2 | 1/2017 | Tang et al. | |
| 9,561,449 B2 | 2/2017 | Wang et al. | |
| 9,568,184 B2 | 2/2017 | Kasuga | |
| 9,572,226 B2 | 2/2017 | Motley et al. | |
| 9,574,763 B2 | 2/2017 | Chen | |
| 9,596,716 B2 | 3/2017 | Deng et al. | |
| 9,602,787 B2 | 3/2017 | Blaser, Jr. et al. | |
| 9,635,740 B2 | 4/2017 | Sun et al. | |
| 9,642,221 B2 | 5/2017 | Schlangen | |
| 9,642,222 B2 | 5/2017 | Fathollahi et al. | |
| 9,651,243 B1 | 5/2017 | Springer | |
| 9,654,678 B1 | 5/2017 | Fu et al. | |
| 9,655,216 B2 | 5/2017 | Murakami et al. | |
| 9,668,053 B1 | 5/2017 | Rivera et al. | |
| 9,713,228 B2 | 7/2017 | Reed | |
| 9,717,132 B2 | 7/2017 | Sun et al. | |
| 9,726,360 B1 | 8/2017 | Alexander et al. | |
| 9,739,472 B1 | 8/2017 | Li | |
| 9,746,138 B1 | 8/2017 | Thomas | |
| 9,750,118 B2 | 8/2017 | Yotsumoto et al. | |
| 9,759,421 B1 | 9/2017 | Baschnagel | |
| 9,765,959 B2 | 9/2017 | Yim et al. | |
| 9,784,417 B1 | 10/2017 | Springer | |
| 9,794,690 B2 | 10/2017 | Wang et al. | |
| 9,800,429 B2 | 10/2017 | Crayford et al. | |
| 9,805,575 B2 | 10/2017 | Sun et al. | |
| 9,807,506 B2 | 10/2017 | Wang et al. | |
| 9,820,024 B1 | 11/2017 | Rolf | |
| 9,822,963 B2 | 11/2017 | Wang et al. | |
| 9,826,298 B2 | 11/2017 | Sun et al. | |
| 9,838,652 B2 | 12/2017 | Chien | |
| 9,848,265 B2 | 12/2017 | Wen et al. | |
| 9,851,092 B2 | 12/2017 | Yotsumoto et al. | |
| 9,874,334 B2 | 1/2018 | Chen | |
| 9,939,143 B2 | 4/2018 | Spiro | |
| 9,955,541 B2 | 4/2018 | Dowling et al. | |
| 9,958,149 B2 | 5/2018 | You et al. | |
| 10,009,982 B2 | 6/2018 | Ben-Moshe et al. | |
| 10,034,356 B2 | 7/2018 | Sun et al. | |
| 10,098,211 B2 | 10/2018 | Recker et al. | |
| 10,111,296 B2 | 10/2018 | Wu et al. | |
| 2004/0175014 A1 * | 9/2004 | Liu | H04R 1/028 381/386 |
| 2007/0086724 A1 | 4/2007 | Grady et al. | |
| 2007/0222631 A1 * | 9/2007 | Haase | G08B 7/06 340/691.5 |
| 2007/0223770 A1 * | 9/2007 | Fujisawa | H04R 7/02 381/396 |
| 2008/0143495 A1 | 6/2008 | Haase | |
| 2009/0136076 A1 | 5/2009 | Chi | |
| 2011/0062888 A1 | 3/2011 | Bondy et al. | |
| 2011/0121654 A1 | 5/2011 | Recker et al. | |
| 2011/0260652 A1 | 10/2011 | Hsieh | |
| 2012/0218978 A1 | 8/2012 | Ishidoshiro | |
| 2012/0320588 A1 | 12/2012 | Quilici et al. | |
| 2013/0049633 A1 | 2/2013 | Wann et al. | |
| 2013/0308315 A1 * | 11/2013 | Capitani | H04R 1/028 362/253 |
| 2013/0320861 A1 | 12/2013 | Sinai et al. | |
| 2014/0118120 A1 | 5/2014 | Chen et al. | |
| 2014/0270264 A1 | 9/2014 | Wang et al. | |
| 2014/0285113 A1 | 9/2014 | Huang | |
| 2014/0286011 A1 | 9/2014 | Luna et al. | |
| 2014/0286517 A1 | 9/2014 | Luna et al. | |
| 2014/0300293 A1 | 10/2014 | Ruan et al. | |
| 2014/0328484 A1 | 11/2014 | Molinie et al. | |
| 2014/0354160 A1 | 12/2014 | Aggarwal et al. | |
| 2015/0043426 A1 | 2/2015 | Aggarwal et al. | |
| 2015/0084518 A1 | 3/2015 | Takahashi | |
| 2015/0130355 A1 | 5/2015 | Rains, Jr. et al. | |
| 2015/0153037 A1 | 6/2015 | Lee | |
| 2015/0312394 A1 | 10/2015 | Mirza et al. | |
| 2016/0050493 A1 | 2/2016 | Wang et al. | |
| 2016/0061438 A1 | 3/2016 | Lu | |
| 2016/0128154 A1 | 5/2016 | Barnetson et al. | |
| 2016/0128167 A1 | 5/2016 | Sun et al. | |
| 2016/0154171 A1 | 6/2016 | Kato et al. | |
| 2016/0198542 A1 | 7/2016 | Chiang | |
| 2016/0198547 A1 | 7/2016 | Pan et al. | |
| 2016/0205362 A1 | 7/2016 | Tang et al. | |
| 2016/0205477 A1 * | 7/2016 | Kuribayashi | H04R 1/028 381/334 |
| 2016/0215933 A1 | 7/2016 | Skelton et al. | |

(56) References Cited

U.S. PATENT DOCUMENTS

| | | | |
|---|---|---|---|
| 2016/0227633 A1 | 8/2016 | Sun et al. | |
| 2016/0230982 A1 | 8/2016 | Simon et al. | |
| 2016/0234414 A1 | 8/2016 | Chen | |
| 2016/0261824 A1 | 9/2016 | Scalisi | |
| 2016/0270148 A1 | 9/2016 | Filipovic et al. | |
| 2016/0284176 A1 | 9/2016 | Harrington et al. | |
| 2016/0295668 A1* | 10/2016 | Saijo | H04R 3/14 |
| 2017/0187154 A1 | 6/2017 | Skelton et al. | |
| 2017/0237471 A1 | 8/2017 | Green et al. | |
| 2017/0238397 A1 | 8/2017 | Green et al. | |
| 2017/0238400 A1 | 8/2017 | Fathollahi et al. | |
| 2017/0244148 A1 | 8/2017 | Ge et al. | |
| 2017/0295629 A1 | 10/2017 | Chiu et al. | |
| 2017/0311062 A1 | 10/2017 | Garrett et al. | |
| 2017/0366886 A1 | 12/2017 | Bernier | |
| 2018/0050634 A1 | 2/2018 | White et al. | |
| 2018/0051872 A1* | 2/2018 | Ivey | F21S 8/026 |
| 2018/0063659 A1 | 3/2018 | Pan | |
| 2018/0077779 A1 | 3/2018 | Johnson | |
| 2018/0077781 A1 | 3/2018 | McCanless et al. | |
| 2018/0356089 A1* | 12/2018 | Zhang | F21V 33/0056 |
| 2019/0041050 A1* | 2/2019 | Cairns | G02B 6/0085 |
| 2019/0394547 A1 | 12/2019 | Lemons et al. | |

FOREIGN PATENT DOCUMENTS

| | | |
|---|---|---|
| CN | 103809548 | 5/2014 |
| CN | 203605159 | 5/2014 |
| CN | 103899963 | 7/2014 |
| CN | 203801112 | 8/2014 |
| CN | 104020733 | 9/2014 |
| CN | 104378886 | 2/2015 |
| CN | 204231709 | 3/2015 |
| CN | 204442783 | 7/2015 |
| CN | 107250930 | 10/2017 |
| EP | 2506686 | 10/2012 |
| EP | 3036594 | 6/2016 |
| KR | 101641510 | 7/2016 |
| KR | 20160100656 | 8/2016 |
| WO | 2011125845 | 10/2011 |
| WO | 2014084413 | 6/2014 |
| WO | 2014160096 | 10/2014 |
| WO | 2014186040 | 11/2014 |
| WO | 2016052956 | 4/2016 |
| WO | 2016066564 | 5/2016 |
| WO | 2017043671 | 3/2017 |
| WO | 2017062776 | 4/2017 |
| WO | 2017157120 | 9/2017 |
| WO | 2017193781 | 11/2017 |
| WO | 2017215406 | 12/2017 |

OTHER PUBLICATIONS

U.S. Appl. No. 16/659,348, Non-Final Office Action, dated Dec. 4, 2020, 11 pages.

U.S. Appl. No. 16/659,344, Non-Final Office Action, dated Feb. 19, 2021, 25 pages.

Application No. CA 3,059,289, Office Action, dated Dec. 11, 2020, 3 pages.

Application No. CA 3,059,292, Office Action, dated Nov. 26, 2020, 4 pages.

Application No. CA 3,059,316, Office Action, dated Nov. 27, 2020, 5 pages.

* cited by examiner

LUMINAIRE WITH AN INTEGRATED SPEAKER

CROSS-REFERENCE TO RELATED APPLICATIONS

This disclosure claims priority to U.S. Provisional Application No. 62/748,248 entitled "Component Integration of Elements Associated with a Luminaire," filed Oct. 19, 2018, to U.S. Provisional Application No. 62/748,253 entitled "Light Fixtures with Integrated Speakers," filed Oct. 19, 2018, to U.S. Provisional Application No. 62/748,268 entitled "Light Fixtures with User Experience Capabilities," filed Oct. 19, 2018, and to U.S. Provisional Application No. 62/748,283 entitled "Light Fixtures with Virtual Assistant Functionality," filed Oct. 19, 2018, the entireties of which are hereby incorporated by reference herein.

TECHNICAL FIELD

This disclosure relates generally to luminaire systems. More specifically, but not by way of limitation, this disclosure relates to systems that seamlessly integrate speakers within housings of luminaires.

BACKGROUND

Connected lighting can include lamps, luminaires, and controls that communicate through technologies such as WiFi, Bluetooth, or any other communication protocols to provide an increased level of control of the lamps, luminaires, and controls. The connected lighting may be controlled with smartphone applications, web portals, voice-activated devices, other control mechanisms, or any combination thereof.

In some examples, it may be desirable to incorporate a speaker within the connected lighting to provide audio within a space illuminated by the connected lighting. Adding the speaker to the connected lighting may be problematic in that for a speaker to have satisfactory sound quality, the speaker cannot be blocked so that air can freely vibrate for sound to be emitted from the speaker. The user expectation of a light emitting luminaire is to see a flat or rounded surface that is continuously illuminated and generally uniform in appearance. Placing a continuous uniform light emitting element in front of a speaker may be problematic in that the light emitting element blocks the sound from the speaker.

SUMMARY

Certain aspects involve connected lighting systems including integrated speakers. For instance, a luminaire includes a speaker positioned at a first depth within a luminaire housing and capable of generating an audio output from a speaker diaphragm. The luminaire also includes a light source that generates a light output. Further, the luminaire includes a light guide assembly positioned at a second depth within the luminaire housing different from the first depth. The light guide assembly includes an acoustically transparent area positioned along a sound path from the speaker diaphragm, and the light guide assembly extracts the light output from the light source and directs the light output away from the luminaire.

In another example, a luminaire includes a speaker diaphragm positioned at a first depth within a luminaire housing and capable of generating an audio output. The luminaire also includes a light source that generates a light output. Further, the luminaire includes a light guide assembly positioned at a second depth within the luminaire housing different from the first depth. The light guide assembly includes an acoustically transparent area positioned along a sound path from the speaker diaphragm. The light guide assembly extracts the light output from the light source and directs the light output away from the luminaire. Furthermore, the luminaire includes a seal between a back-volume and a front-volume of the speaker diaphragm.

In another example, a luminaire includes a speaker positioned at a first depth within a luminaire housing. The speaker generates an audio output from a speaker diaphragm, and the speaker diaphragm includes a reflective surface. The luminaire also includes a first light source positioned at a second depth within the luminaire housing different from the first depth. The first light source generates a light output directed toward the speaker diaphragm such that the reflective surface of the speaker diaphragm reflects the light output toward a space in a direction of a sound path of the audio output.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

DETAILED DESCRIPTION

The present disclosure relates to luminaire systems that provide lighting output and audio output to a space surrounding the luminaire systems. Speakers of the luminaire system may be hidden such that the speakers do not visibly detract from the lighting output of the luminaire system. As a result, the luminaire system with one or more speakers may have an appearance that is similar to a luminaire that lacks speakers while also providing the functionality of a speaker.

The subject matter of the presently disclosed embodiments is described herein with specificity to meet statutory requirements, but this description is not necessarily intended to limit the scope of the presently disclosed subject matter. The disclosed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
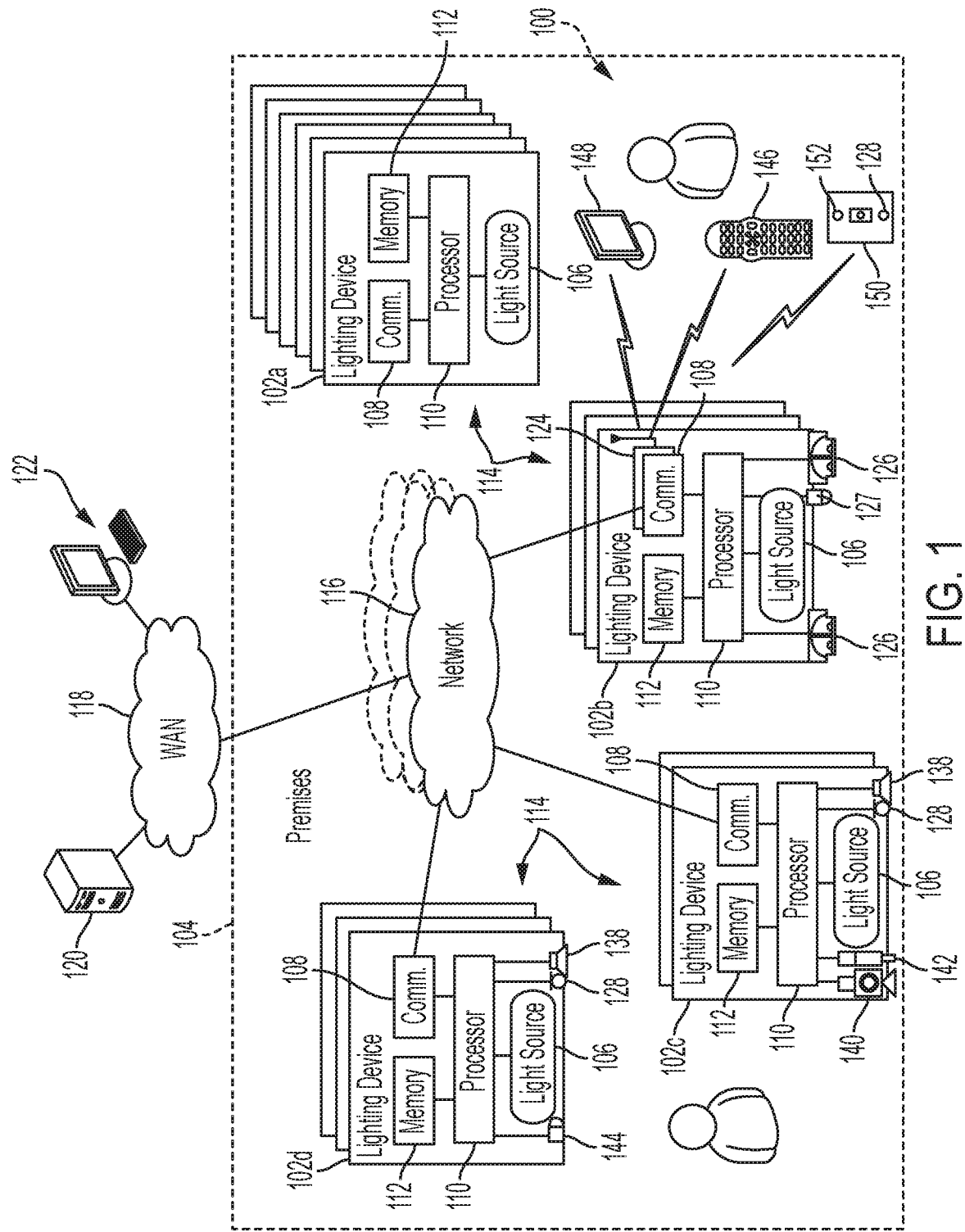
FIG. 1 depicts a block diagram of a light system including intelligent luminaires, according to certain aspects of the present disclosure.

FIG. 1 is a block diagram depicting a light system 100. The illustrated light system 100 includes a number of intelligent luminaires 102, such as recessed lights, pendant lights, fluorescent fixtures, lamps, etc. The intelligent luminaires 102 are represented in several different configurations. In another example, the intelligent luminaires 102 may all include the same configuration. Additionally, one or more of the intelligent luminaires 102 may be replaced by other connected devices (i.e., devices that are controllable through wired or wireless communication by other devices).

The intelligent luminaires 102 illuminate a service area to a level useful for a human in or passing through a space. One or more of the intelligent luminaires 102 in or on a premises 104 served by the light system 100 may have other lighting purposes, such as signage for an entrance to the premises 104 or to indicate an exit from the premises 104. The intelligent luminaires may also be configured for any other lighting or non-lighting purposes.

In an example, each of the intelligent luminaires 102 include a light source 106, a communication interface 108, and a processor 110 coupled to control the light source 106. The light sources 106 may be any type of light source suitable for providing illumination that may be electronically controlled. The light sources 106 may all be of the same type (e.g., all formed by some combination of light emitting diodes), or the light sources may have different types of light sources 106.

The processor 110 is coupled to communicate using the communication interface 108 and a network link with one or more others of the intelligent luminaires 102 and is able to control operations of at least the respective intelligent luminaire 102. The processor 110 may be implemented using hardwired logic circuitry, but in an example, the processor 110 may also be a programmable processor such as a central processing unit (CPU) of a microcontroller or a microprocessor. In the example of FIG. 1, each intelligent luminaire 102 also includes a memory 112, which stores programming for execution by the processor 110 and data that is available to be processed or has been processed by the processor 110. The processors 110 and memories 112 in the intelligent luminaires 102 may be substantially the same throughout the devices 114 throughout the premises 104, or different devices 114 may have different processors 110, different amounts of memory 112, or both depending on differences in intended or expected processing needs.

In an example, the intelligence (e.g., the processor 110 and the memory 112) and the communications interface(s) 108 are shown as integrated with the other elements of the intelligent luminaire 102 or attached to the fixture or other element that incorporates the light source 106. However, for some installations, the light source 106 may be attached in such a way that there is some separation between the fixture or other element that incorporates the electronic components that provide the intelligence and communication capabilities. For example, the communication interface(s) 108 and possibly the processor 110 and the memory 112 may be elements of a separate device or component that is coupled or collocated with the light source 106.

The light system 100 is installed at the premises 104. The light system 100 may include a data communication network 116 that interconnects the links to and from the communication interfaces 108 of the intelligent luminaires 102. In an example, interconnecting the intelligent luminaires 102 across the data communication network 116 may provide data communications amongst the intelligent luminaires 102. Such a data communication network 116 may also provide data communications for at least some of the intelligent luminaires 102 via a data network 118 outside the premises, shown by way of example as a wide area network (WAN), so as to allow the intelligent luminaires 102 or other connected devices at the premises 104 to communicate with outside devices such as a server or host computer 120 or a user terminal device 122. The wide area network 118 outside the premises 104 may be an intranet or the Internet, for example.

The intelligent luminaires 102, as well as any other equipment of the light system 100 or that uses the communication network 116 in a service area of the premises 104, connect together with and through the network links and any other media forming the communication network 116. For lighting operations, the intelligent luminaires 102 (and other system elements) for a given service area are coupled together for network communication with each other through data communication media to form a portion of a physical data communication network. Similar elements in other service areas of the premises are coupled together for network communication with each other through data communication media to form one or more other portions of the physical data communication network at the premises 104. The communication interface 108 in each intelligent luminaire 102 in a particular service area may be of a physical type and operate in a manner that is compatible with the physical media and electrical protocols implemented for the particular service area or throughout the premises 104. Although the communication interfaces 108 are shown communicating to and from the communication network 116 using lines, such as wired links or optical fibers, some or all of the communication interfaces 108 may use wireless communications media such as optical or radio frequency wireless communication.

Various network links within a service area, amongst devices in different areas or to wider portions of the communication network 116 may utilize any convenient data communication media, such as power line wiring, separate wiring such as coaxial or Ethernet cable, optical fiber, free-space optical, or radio frequency wireless (e.g., Bluetooth or WiFi). The communication network 116 may utilize combinations of available networking technologies. Some or all of the network communication media may be used by or made available for communications of other gear, equipment, or systems within the premises 104. For example, if combinations of WiFi and wired or fiber Ethernet are used for the lighting system communications, the WiFi and Ethernet may also support communications for various computer and/or user terminal devices that the occupant(s) may want to use in the premises 104. The data communications media may be installed at the time as part of installation of the light system 100 at the premises 104 or may already be present from an earlier data communication installation. Depending on the size of the communication network 116 and the number of devices and other equipment expected to use the communication network 116 over the service life of the communication network 116, the communication network 116 may also include one or more packet switches, routers, gateways, etc.

In addition to the communication interface 108 for enabling a lighting device to communicate via the communication network 116, some of the devices 11 may include an additional communication interface, shown as a wireless interface 124 in the intelligent luminaire 102b. The additional wireless interface 124 allows other elements or equipment to access the communication capabilities of the light system 100, for example, as an alternative user interface access or for access through the light system 100 to the WAN 118. In an example, the wireless interface 124 may communicate wirelessly with other devices through slot antennas or inverted F slot antennas positioned on a trim component of the intelligent luminaire 102b.

The host computer or server 120 can be any suitable network-connected computer, tablet, mobile device or the like programmed to implement desired network-side functionalities. Such a device may have any appropriate data communication interface to link to the WAN 118. Alternatively or in addition, the host computer or server 120 may be operated at the premises 104 and utilize the same networking media that implements the data communication network 116.

The user terminal device 122 may be implemented with any suitable processing device that can communicate and offer a suitable user interface. The user terminal device 122, for example, is shown as a desktop computer with a wired link into the WAN 118. Other terminal types, such as laptop computers, notebook computers, netbook computers, and smartphones may serve as the user terminal device 122. Also, although shown as communicating via a wired link from the WAN 118, such a user terminal device may also or alternatively use wireless or optical media, and such a device may be operated at the premises 104 and utilize the same networking media that implements the data communication network 116.

The external elements, represented generally by the server or host computer 120 and the user terminal device 122, which may communicate with the intelligent luminaires 102 of the system 100 at the premises 104, may be used by various entities or for various purposes in relation to operation of the light system 100 or to provide information or other services to users within the premises 104.

In the example of the light system 100, at least one of the intelligent luminaires 102 may include a user input sensor capable of detecting user activity related to user inputs without requiring physical contact of the user. Further, at least one of the intelligent luminaires 102 may include an output component that provides information output to the user.

Some of the intelligent luminaires 102 may not have user interface related elements. In the example of the light system 100, each of the intelligent luminaires 102a includes a light source 106, a communication interface 108 linked to the communication network 116, and a processor 110 coupled to control the light source 106 and to communicate via the communication interface. Such intelligent luminaires 102a may include lighting related sensors (not shown), such as occupancy sensors or ambient light color or level sensors; but the intelligent luminaires 102a do not include any user interface components for user input or for output to a user (other than control of the respective light source 106). The processors of the intelligent luminaires 102a are programmable to control lighting operations, for example, to control the light sources 106 of the intelligent luminaires 102a in response to commands received from the communication network 116 and the communication interfaces 108.

Other examples of the intelligent luminaires 102b, 102c, and 102d may include one or more user interface components. Although three examples are shown, it is envisaged that still other types of interface components or arrangements thereof in various intelligent lighting devices may be used in any particular implementation of a system like the light system 100. Any one intelligent luminaire that includes components to support the interactive user interface functionality of the light system 100 may include an input sensor type user interface component, an output type user interface component, or a combination of one or more input sensor type user interface components with one or more output type user interface components.

Each of some number of intelligent luminaires 102b at the premises 104 may include one or more sensors 126. The intelligent luminaires 102b can be in one or more rooms or other service areas at the premises 104. In the intelligent luminaires 102b, each of the sensors 126 is configured for detection of intensity of received light and to support associated signal processing to determine direction of incident light. A particular example of the sensor 126 that can be used as an input device for determining direction and intensity of incident light received by the sensor 126 is a quadrant hemispherical light detector or "QHD." The sensors 126 may detect light in some or all of the visible portion of the spectrum or in other wavelength bands, such as infrared (IR) or ultraviolet (UV). By using two or more such sensors 126 in the same or a different intelligent luminaire 102b illuminating the same service area, it is possible to detect position of an illuminated point or object in three-dimensional space relative to known positions of the sensors 126. By detecting position of one or more points over time, it becomes possible to track motion within the area illuminated by the intelligent luminaire(s) 102b and monitored for user input by the sensors 126, for example, as a gestural user input. Although two sensors 126 are shown on one intelligent luminaire 102b, there may be more sensors 126 or there may be a single sensor 126 in each intelligent luminaire 102b amongst some number of the intelligent luminaires 102b illuminating a particular service area of the premises 104.

In the example, at least one of the intelligent luminaires 102b also includes a lighting related sensor 127. Although shown in the intelligent luminaire 102b for purposes of discussion, such a sensor may be provided in any of the other intelligent luminaires 102, in addition or as an alternative to deployment of the sensor 127 in a lighting intelligent luminaire 102b. Examples of such lighting related sensors 127 include occupancy sensors, device output (level or color characteristic, which may include light color, light temperature, or both) sensors, and ambient light (level or color characteristic, which may include light temperature, or both) sensors. The sensor 127 may provide a condition input for general lighting control (e.g., to turn on or off the intelligent luminaires 102 or adjust outputs of the light sources 106). However, sensor input information from the sensor 127 also or alternatively may be used as another form of user input, for example, to refine detection and tracking operations responsive to signals from the sensors 126.

In an example of a user input related function, the signals from the sensors 126 in the intelligent luminaires 102b illuminating a particular room within the premises 104 are processed to detect gestures of one or more persons or users within the room. The lighting output from the light sources 106 of the devices 114 illuminating the area may be controlled responsive to the detection of one or more predetermined user input gestures. Although not shown, one or more of the intelligent luminaires 102b may also include a user output component, for example to provide an audio or video output of information to the person or persons in the room.

Such gesture input together with lighting control and other information output implement a form of interactive user interface. This interface related operation includes selectively controlling a lighting operation of at least some number of the lighting devices as a function of a processed user input. The interface related operation may also include either controlling a non-lighting-related function as a function of a processed user input, or an operation to obtain and provide information as a response to a user input as an output via the output component.

In the example of the light system 100, each of the intelligent luminaires 102c and one or more of the intelligent luminaires 102d in one or more rooms or other service areas of the premises 104 may support audio input and audio output for an audio based user interface functionality. Also, audio user interface components may be provided in other intelligent luminaires 102 that are different from those deploying the video user interface components. For convenience, the audio input and output components and the video input and output components are shown together in each of the intelligent luminaires 102c, one or more of which may be deployed with other lighting devices in some number of the services areas within premises 104.

In the example of FIG. 1, each intelligent luminaire 102c, one or more of the intelligent luminaires 102d, or a combination thereof includes an audio user input sensor such as a microphone 128. Any type of microphone capable of detecting audio user input activity, for example, for speech recognition of verbal commands or the like, may be used. Although the audio output may be provided in different devices 114, each of the intelligent luminaires 102c or 102d may include an audio output component such as one or more speakers 138 that provide information output to the user. Where the speaker 138 is provided, there may be a single speaker 138 or there may be a plurality of speakers 138 in each respective intelligent luminaire 102.

The audio input together with lighting control and audio information output implement an additional form of interactive user interface. The user interface related operation includes selectively controlling a lighting operation of at least some number of the intelligent luminaires 102 as a function of a processed user input. The interface related operation may also include either control of a non-lighting-related function as a function of a processed user input, or an operation to obtain and provide information as a response to a user input as an output via the output component. For example, a user audio input (e.g., a voice command) may be processed to control a non-lighting device 114 (e.g., an HVAC unit, a washer, a dryer, etc.) that is communicatively connected to the communication network 116. Further, the intelligent luminaires 102 may respond with audible information when the microphone 128 receives a user request for information (e.g., a weather update, movie show times, etc.).

In an example, a physical mechanism may be implemented to mute the microphones 128 of the intelligent luminaire 102 instead of implementing only a soft mute function (e.g., via software control) when the user would like privacy from the microphones 128 that may constantly be listening for a wake word. The physical mechanism may also be included on any other device with a microphone 128 that is constantly listening for a wake word. In other words, the microphones 128 may be muted using a mechanical or physical device rather than only a software routine. The hard mute design may incorporate a movable assembly into the intelligent luminaire 102 with components that physically (i.e., mechanically) create a temporary seal over any microphone porting holes of the microphone 128. The movable assembly can also activate an electro-mechanical or hall-effect switch that electrically disconnects the microphone signal paths for additional privacy and peace-of-mind.

A soft mute functionality of the microphone 128 may be performed simultaneously with the hard mute of the microphone 128 described above, or the soft mute functionality may be performed independently. The soft mute functionality is a software method that enables muting of the microphone 128 of the intelligent luminaire 102 remotely using a companion mobile application (e.g., on a mobile device or tablet). The soft mute functionality may preserve user privacy by enabling the user to mute voice assistant services of a virtual assistant enabled luminaire. In an example where the intelligent luminaire 102 is ceiling mounted and far away from the normal user, a hardware mute button may not be practical for an occupant of a room containing the intelligent luminaire 102. Using a software based mute button will provide a mechanism for the user to shut down the microphones 128 on the intelligent luminaire 102 to stop a voice service from listening to the user.

Implementing a software mute virtual button on a user interface of the mobile application may enable the user to press a button on the mobile application that results in the mobile device sending a mute command wirelessly to the intelligent luminaire 102. The mute command may instruct a microcontroller unit (MCU) to toggle a general-purpose input/output (GPIO) on a microphone switch circuit such that the GPIO removes a power supply from the microphones 128. Removing the power supply results in the microphone 128 being rendered non-operational until the GPIO is toggled again to reconnect the power supply with the microphone 128. For example, the GPIO may be toggled to reconnect the power supply upon receiving an unmute signal from the mobile device based on a user interaction with the mobile application, or the GPIO may be toggled upon automatically timing out the mute functionality after a specified amount of time. Removing the power supply from the microphone 128 functions in a similar manner to a hardware mute button except that the command from the user to the intelligent luminaire 102 is done remotely via wireless connection between the mobile application and the intelligent luminaire 102.

Although shown for illustration purposes in the intelligent luminaire 102c, image-based input and/or output components may be provided together or individually in any others of the intelligent luminaires 102 that may be appropriate for a particular installation. Although referred to at times as "video," the image-based input and/or output may utilize still image input or output or may use any appropriate form of motion video input or output. In the example of the light system 100, each of several of the intelligent luminaires 102d in one or more rooms of the premises 104 also supports image input and output for a visual user interface functionality.

For the visual user interface functionality an intelligent luminaire 102c includes at least one camera 140. The camera 140 could be a still image pickup device controlled to capture some number of images per second, or the camera 140 could be video camera. By using a number of cameras 140 to capture images of a given service area, it is possible to process the image data to detect and track user movement in the area, for example, to identify user input gestures. The multiple cameras 140 could be in a single intelligent luminaire 102c or could be provided individually in two or more of the lighting devices that illuminate a particular room or other service area. The image capture may also support identification of particular individuals. For example, individuals may be identified using facial recognition and associated customization of gesture recognition or user responsive system operations.

A visual output component in the intelligent luminaire 102c may be a projector 142, such as a pico projector. The visual output component may take other forms, such as an integral display as part of or in addition to the light source. The projector 142 can present information in a visual format, for example, as a projection on a table or a desk top or a wall or the floor. Although shown in the same intelligent luminaire 102c as the camera 140, the projector 142 may be in a different intelligent luminaire 102.

One or more of the processors 110 in the intelligent luminaires 102 are able to process user inputs detected by the user input sensor(s), such as the visual sensors 126, 128, 140, the microphone(s) 128, or a combination thereof. Other non-contact sensing technologies may also be used (e.g., ultrasound) instead of or in combination with the input sensors discussed above. The processing of sensed user inputs may relate to control operations of the intelligent luminaires in one or more areas of the premises 104. For example, the processing may detect spoken commands or relevant gestural inputs from a user to control the intelligent lighting devices in an area in which the user is located (e.g., to turn lights ON/OFF, to raise or lower lighting intensity, to change a color characteristic of the lighting, or a combination thereof).

In addition to lighting control functions, such as mentioned here by way of example, one or more of the processors 110 in the intelligent luminaires 102 may be able to process user inputs so as to enable the light system 100 to obtain and present requested information to a user at the premises 104. By way of an example of such additional operations, the light system 100 may also enable use of the intelligent luminaires 102 to form an interactive user interface portal for access to other resources at the premises 21 (e.g., on other non-lighting devices in other rooms at the premises) or enable access to outside network resources such as on the server 120 or a remote terminal 122 (e.g., via the WAN 118).

Any one or more of the intelligent luminaires 102 may include a sensor 144 for detecting operation of the light source 106 within the respective intelligent luminaire 102. The sensor 144 may sense a temperature of the light source 106 or sense other components of the intelligent luminaire 102. The sensor 144 may also sense an optical output of the light source 106 (e.g., a light intensity level or a color characteristic). The sensor 144 may provide feedback as to a state of the light source 106 or other component of the intelligent luminaire 102, which may be used as part of the general control of the intelligent luminaires 102.

The sensor 144 may also be a wireless or wired environmental monitoring element, and the intelligent luminaire 102 may include one or more of the sensors 144. Monitoring of environmental parameters using the intelligent luminaire 102 can provide information about the surrounding environment and the human occupancy status of a space where the intelligent luminaire 102 is installed. In some examples, the intelligent luminaire 102 may be referred to as a smart connected luminaire. The term "smart connected luminaire" may refer to a luminaire that is capable of communicating with other devices (e.g., environmental sensors, internet of things (IoT) devices, other luminaires, the internet, etc.). Further, the smart connected luminaire may be capable of receiving or sending signals from sensors or transducers of other IoT devices, processing the signals, and performing operations based on the processed signals.

In an example, the sensors 144 (e.g., detectors and sensors) may be integral within the intelligent luminaire 102, the sensors 144 may be wirelessly coupled to the intelligent luminaire 102, or the sensors 144 may be in wired communication with the intelligent luminaire 102. The sensors 144 provide environmental monitoring statuses to the intelligent luminaire 102. In turn, the intelligent luminaire 102 may provide the environmental monitoring statuses to a cloud computing service (e.g., at the server 120) for analytics. For example, the intelligent luminaire 102 may act as a wireless local area network (LAN) access point to all smart wireless LAN or Bluetooth capable detectors and sensors capable of connecting to the intelligent luminaire 102. In this manner, each detector or sensor may be monitored for its data, which may include and not be limited to temperature levels, light levels, gas detection, air quality detection, humidity levels, any other suitable statuses, or any combination thereof.

Additionally, the intelligent luminaire 102 may use voice activation services to monitor sound levels (e.g., using the microphone 128) in the environment surrounding the intelligent luminaire 102. By monitoring the sound levels, the intelligent luminaire 102 may be able to detect human presence and distinguish individual voices. The voice detection and distinction may be performed by training the intelligent luminaire 102 to detect and identify occupant voices using the luminaire microphone array (i.e., the microphone 128) that is used in the intelligent luminaire 102 for interacting with voice assistant voice services (e.g., Alexa® by Amazon Technologies, Inc., Google Now and Google Assistant by Google LLC, Cortana® by Microsoft Corporation, Siri® by Apple Inc., any other virtual assistant services, or any combination thereof).

The intelligent luminaire 102 may receive environmental health and monitoring data from any smart sensors 144 capable of communicating with the intelligent luminaire 102. The smart sensors 144 may include gas detectors, motion sensors, temperature and humidity sensors, light detectors, or any smart sensors capable of communicating with the intelligent luminaire 102. Industrial use sensors in communication with the smart collected light may collect machine sensor data in hazardous areas and process the data analytically. Additionally, preventative maintenance of industrial grade equipment may rely on outdoor or commercial space sensors in communication with the intelligent luminaire 102. Further, the intelligent luminaire 102 is able to provide the environmental monitoring data to a cloud computing service to pool and analyze the sensor data. The environmental monitoring detectors and sensors include but are not limited to: microphones; proximity sensors; cameras; LIDAR and SONAR; ultrasonic sensors; smoke and carbon monoxide detectors; temperature sensors; humidity sensors; barometric pressure sensors; light sensors; radios; Wi-Fi repeaters; or any other suitable detectors and sensors. These sensors may collect data that can be processed for functions that include but are not limited to: audio/video playback and alerts for sleep monitoring (e.g., a snoring monitor); audio/video playback and alerts for occupancy monitoring (e.g., baby monitors, nanny cams, elder care, etc.); alerts for smoke detection; alerts for carbon monoxide detection; alerts for security breaches; facial recognition; circadian rhythm monitoring; user occupancy detection; voice recognition; people counting; geofencing; temperature control based on room occupancy; lighting control based on room occupancy; temperature and lighting control based on received voice commands; any other suitable functions; or any combination thereof. Further, the sensors and functions may be used in residential environments, hotel environments, commercial environments, or any other environments. It may be expected that the intelligent luminaire 102 will act as a sensor hub that can source or synchronize environmental sensor data.

In the light system 100, the intelligent luminaires 102 incorporate the elements and provide processing to support an interactive user interface that does not require a user to touch or otherwise physically contact an element of the light system 100. The user also does not have to operate a separate device, such as a smartphone or other portable terminal device. The intelligent luminaires 102 implement the interactive user interface to the light system 100, and the user interacts with the light system 100 using the intelligent luminaires 102.

The light system 100 may also include or support communications for other elements or devices at the premises 104, some of which may offer alternative user interface capabilities instead of or in addition to the interactive user interface supported by the intelligent luminaires 102. For example, user interface elements of the light system 100 may be interconnected to the data communication network 116 of the light system 100. Standalone sensors of the lighting system may also be incorporated in the light system 100, where the standalone sensors are interconnected to the data communication network 116. At least some of the standalone sensors may perform sensing functions analogous to those of sensors 127 and 144.

The light system 100 may also support wireless communication to other types of equipment or devices at the premises 104 to allow the other equipment or devices to use the data communication network 116, to communicate with the intelligent luminaires 102, or both. By way of example, one or more of the intelligent luminaires 102 may include the wireless interface 124 for such a purpose. Although shown in the intelligent luminaire 102b, the wireless interface 124 may instead or in addition be provided in any of the other intelligent luminaires 102 in the light system 100. A wireless link offered by the wireless interface 124 enables the light system 100 to communicate with other user interface elements at the premises 104 that are not included within the intelligent luminaires 102. In an example, a remote control 146 may represent an additional input device operating as an interface element and a television or monitor 148 may represent an additional output device operating as an interface element. The wireless links to devices like the remote control 146 or the television or monitor 148 may be optical, sonic (e.g., speech), ultrasonic, or radio frequency, by way of a few examples.

In an example, the intelligent luminaires 102 are controllable with a wall switch accessory 150 in addition to direct voice control or gesture control provided to the intelligent luminaire 102, as discussed above. The wall switch accessory 150 wirelessly connects to the virtual assistant enabled luminaire or other compatible device using the wireless interface 125. The wireless connection between the wall switch accessory 150 and the intelligent luminaire 102 enables voice and manual control of the luminaire to extend the control range available to the luminaire.

A location of the intelligent luminaire 102 may create a situation where the intelligent luminaire 102 is too far from a user to detect audible commands from the user. Additionally, acoustic interference during speaker audio playback may prevent the intelligent luminaire 102 from detecting audio commands from the user. In one or more examples, the location of the intelligent luminaire 102 (e.g., in a ceiling) may not provide the user with physical access to interact with the device to overcome the distance and interference issues associated with detecting the audible commands from the user.

The wall switch accessory 150 extends many of the intelligent luminaire features and abilities through a wireless connection. The wall switch accessory 150 addresses the physical distance issue by replacing a set of microphones 128 contained in the intelligent luminaire 102 with a set of microphones 128 located at another location within the room. In another example, the wall switch accessory 150 addresses the physical distance issue by adding additional microphones 128 associated with the luminaire at the other location within the room. Further, the wall switch accessory 150 provides a mechanism for the user to press a physical button 152 to instruct the microphones in the wall switch accessory 150 to listen to a voice command.

In an example, the wall switch accessory may provide a voice stream received at the microphones 128 in the wall switch accessory 150 to the intelligent luminaire 102 through a Bluetooth connection. In another example, the wall switch accessory 150 may provide the voice stream to the luminaire through a shared cloud account using Wi-Fi. For example, the wall switch accessory 150 may provide the voice stream to a cloud account (e.g., a voice service cloud account) through a wireless router, and the cloud account processes the voice stream and provides a command or request associated with the voice stream to the intelligent luminaire 102. Other wireless communication protocols are also contemplated for the transmission of the voice stream to the intelligent luminaire 102.

The wall switch accessory 150 can also instruct the intelligent luminaire 102 to pause or mute audio playback while the voice commands are being communicated. In an example, the wall switch accessory 150 may have physical buttons (e.g., the button 152) to allow the user to control features of the intelligent luminaire 102 when the device is unreachable for direct physical interaction. The controllable features of the intelligent luminaire 102 may include increasing or decreasing a speaker volume of the luminaire, pausing or playing music playback through the speaker of the luminaire, muting a speaker output of the luminaire, muting the microphones of the luminaire and the wall switch accessory for privacy, increasing or decreasing a lamp brightness of the luminaire, changing a lamp color temperature of the luminaire, or turning off the lamp of the luminaire. The physical buttons of the wall switch accessory 150 capable of controlling the controllable features of the intelligent luminaire 102 may perform the control through Bluetooth connections, Wi-Fi connections, or any other suitable wireless communication connections.

Further, other devices may be used in place of the wall switch accessory 150. For example, the functionality of the wall switch accessory 150 may be integrated in a device that also controls non-lighting functions. Other functions of the intelligent luminaire 102 may also be provided remotely. For example, lights or other elements used for non-verbal communication may be incorporated as part of the wall switch accessory 150 or other devices that perform similar functions.

The intelligent luminaires 102, as discussed above and shown in the FIG. 1, may include user interface related components for audio and optical (including image) sensing of user input activities. The intelligent luminaire 102 also includes interface related components for audio and visual output to the user. These capabilities of the intelligent luminaires 102 and the light system 100 support an interactive user interface through the lighting devices to control lighting operations, to control other non-lighting operations at the premises, to provide a portal for information access (where the information obtained and provided to the user may come for other equipment at the premises 104 or from network communications with off-premises systems), or any combination thereof.

For example, the intelligent luminaire 102 or the light system 100 can provide a voice recognition/command type interface using the intelligent luminaire 102 and the data communication network 116 to obtain information, to access other applications or functions, etc. For example, a user at the premises 104 can ask for information such as a stock quote or for a weather forecast for the current location of the premises 104 or for a different location than the premises 104. The user can ask the system to check a calendar for meetings or appointments and can ask the system to schedule a meeting.

In an example, the speech may be detected and digitized in the intelligent luminaire 102 and is processed to determine that the intelligent luminaire 102 has received a command or a speech inquiry. For an inquiry, the intelligent luminaire 102 sends a parsed representation of the speech through the light system 100 (and possibly through the WAN 118) to the server 120 or to a processor within one of the intelligent luminaires 102 with full speech recognition capability. The server 120 identifies the words in the speech and initiates the appropriate action to obtain requested information from an appropriate source via the Internet or to initiate an action associated with the speech. The server 120 sends the information back to the intelligent luminaire 102 (or possibly to another device) with the appropriate output capability, for presentation to the user as an audible or visual output. Any necessary conversion of the information to speech may be done either at the server 120 or in the intelligent luminaire 102, depending on the processing capacity of the intelligent luminaire 102. As the processing capacity of lighting devices increases, some or all of the functions of the server in this example may be shifted into the lighting devices.

The intelligent luminaire 102 and the light system 100 may provide similar services in response to gestural inputs, detected via the sensors 126, one or more cameras 140, or a combination of sensors and cameras. Also, systems that include both audio and optical input components can respond to combinations of speech and gestural inputs. Systems that include both audio and video output components can present information to the user in various desirable combinations of audio and image or video outputs.

In an example, the intelligent luminaire 102 incorporates artificial intelligence of a virtual assistant. For example, the intelligent luminaire 102 may include functionality associated with voice assistants such as Alexa® by Amazon Technologies, Inc., Google Now and Google Assistant by Google LLC, Cortana® by Microsoft Corporation, Siri® by Apple Inc., any other virtual assistants, or any combination thereof. The virtual assistant enabled functionality of the intelligent luminaire 102 provides voice enabled control of the luminaire lighting features such as a correlated color temperature (CCT) output by the intelligent luminaire 102, lumens output by the intelligent luminaire 102, a configuration of the intelligent luminaire 102, operational modes of the intelligent luminaire 102 (e.g., environmental detection modes, occupancy detection modes, etc.), configuration of any other networked luminaires, any other luminaire lighting feature, or any combination thereof.

Further, in the intelligent luminaires 102 including the speakers 138, the virtual assistant enabled functionality of the intelligent luminaire 102 controls speaker features such as volume, bass, independent channel control, other speaker features, or any combination thereof. The speaker 138 within or associated with the intelligent luminaire 102 may be a speaker element that includes a single speaker or a multiple speaker arrangement. For example, the speaker 138 may be a coaxial loudspeaker with two or more drive units. In such an example, a tweeter may be mounted in front of a subwoofer, and the virtual assistant enabled functionality of the intelligent luminaire 102 is able to control speaker features of both the tweeter and the subwoofer. The speaker 138 may also be a midwoofer-tweeter-midwoofer (MTM) loudspeaker configuration. In the MTM configuration, the virtual assistant enabled intelligent luminaire 102 is able to control speaker features of all three of the drive units (i.e., drive units for the two midwoofers and the tweeter).

The speaker 138 of the intelligent luminaire 102 may be integrated with the intelligent luminaire 102 or be a modular sub-assembly that is capable of being added to or removed from the intelligent luminaire 102. The speaker 138 may include one or more cosmetic pieces to cover the speaker 138 such as a grill or cloth that is acoustically transparent. The cosmetic piece could also be highly reflective in addition to being acoustically transparent. Accordingly, the cosmetic pieces may be installed to balance aesthetic quality, acoustic quality, and light emission quality.

The virtual assistant enabled intelligent luminaire 102 may also include a lens with a beam shaping (e.g., optical distribution) functionality. The virtual assistant may provide control of the intelligent luminaire 102 to control the beam shaping functionality. A lighting element (e.g., the light source 106) of the intelligent luminaire 102 may be a backlight or a waveguide design. Further, the lighting element may be perforated in numerous different arrangements to optimize sound waves that are transmitted through the lighting element from a speaker 138 positioned behind the lighting element.

In an example, the intelligent luminaire 102 may provide a mechanism for non-verbal communication with a user via visual feedback controlled by the virtual assistant. The non-verbal communication may be achieved through accent lighting on a trim ring of the intelligent luminaire 102, or any other lighting features incorporated within the intelligent luminaire 102. For example, the virtual assistant may control the main lighting output of the intelligent luminaire 102 to change colors or change illumination patterns or levels to provide the non-verbal communication to an occupant of a room within the premises 104.

The intelligent luminaire 102 with audio functionality may visually mask audio producing elements (e.g., the speakers 138) with an acoustically transparent lens positioned on a side of the intelligent luminaire 102 facing a room or other area of the premises 104 that is illuminated by the intelligent luminaire 102. For example, it may be desirable to incorporate the speaker 138 within the intelligent luminaire 102 to provide hidden audio within the premises 104. The presently disclosed subject matter includes multiple ways to improve the look of the speaker 138 and light source 106 of a luminaire (e.g., the intelligent luminaire 102) while allowing for airflow of the speaker 138 to produce satisfactory audio.

In an example, the intelligent luminaire 102, or a set of intelligent luminaires 102, may provide location based services. For example, indoor user positioning may involve a number of location sensing technologies that combine various methods to detect a user location indoors. While GPS is typically limited to functioning outdoors, indoor positioning may be needed to estimate user positions during emergency scenarios and while trying to place user locations indoors accurately on a facility map.

The intelligent luminaires 102 that are equipped with virtual assistant voice services (e.g., Alexa® by Amazon Technologies, Inc., Google Now and Google Assistant by Google LLC, Cortana® by Microsoft Corporation, Siri® by Apple Inc., any other virtual assistant services, or any combination thereof) can be used to provide coarse indoor user positions while a user is invoking the intelligent luminaire 102 to execute voice service commands. Other indoor positioning technologies may also be deployed that rely heavily on a radio frequency signature map or trilateration techniques using radio frequency signal strengths. The presently disclosed subject matter leverages audio sniffing capabilities (e.g., listening for wake words) of the intelligent luminaires 102 that support virtual assistant voice services to be able to detect a specific user and provide the specific user with the user's present location in accordance with a previously surveyed virtual assistant voice service enabled intelligent luminaire 102.

The intelligent luminaire 102 may provide a method of proximity detection. The method of proximity detection may calculate user location coordinates based on detecting a specific user according to a voice profile or voice signature of the specific user. The intelligent luminaire 102 may support voice assistant services and also support a voice recognition engine. Multiple microphone arrays (e.g., the microphones 128) may be deployed in one or more intelligent luminaires 102 to detect user voice profiles and execute voice commands according to various voice service platforms. In an example, a user voice signature or profile is detected and recognized after being compared to a stored voice signature or profile of the user. Upon detection, the smart connected luminaire is able to provide coarse coordinates of a location of the user to a location server. The coarse coordinates are based on coordinates associated with the intelligent luminaire 102 and the ability to detect the user voice only within a specific distance from the intelligent luminaire 102 (e.g., within a 10 or 15 foot radius). Thus, the coarse coordinates are accurate to within that distance.

In an example, the intelligent luminaire 102 may know its own coordinates (e.g., a location within a room in which the intelligent luminaire 102 is installed), and the intelligent luminaire 102 provides an indication of the coordinates to the location server when identifying and locating a user. In another example, the intelligent luminaire 102 does not know its own coordinates, and the intelligent luminaire 102 provides an indication of its identifier to the location server. In such an example, the location server assigns the coarse coordinates to the user based on the identifier of the intelligent luminaire 102 and the known coordinates of the individual intelligent luminaires 102 stored at the location server. In one or more examples, the cameras 140 may work in conjunction with the intelligent luminaires 102 to provide even more precision to the coarse coordinates. For example, the cameras can detect a specific position of the user within a room after the intelligent luminaire 102 has identified the room in which the user is located.

In one or more examples, the intelligent luminaire 102 may provide Voice over Internet Protocol (VoIP) services. Office conference rooms may include table top conference bridge systems. The conference bridge systems include deficiencies such as: consuming table top space; no "smart" capabilities (e.g., no ability to connect or communicate with other devices or networks); inability to store contact lists; difficulty associated with dialing numbers through a touch panel; and poor sound quality at certain table positions. Similarly, home phones include deficiencies such as: difficulty associated with storing contact lists; insufficient sound volume (e.g., suitable for a single person or a small group); or insufficient microphone capabilities.

The intelligent luminaire 102, or a set of intelligent luminaires 102, with the built-in microphone array (e.g., the microphone 128), the speaker 138, Wi-Fi connectivity, voice control capability, and mobile application compatibility can provide VoIP services. The VoIP service may be provided by the intelligent luminaire 102 by creating an account with a VoIP service provider, such as Google Voice, or by linking the intelligent luminaire 102 with other VoIP applications, such as Skype. Dial, answer, and decline functions of the VoIP service may be realized through a mobile application capable of controlling operations of the intelligent luminaire 102 or through voice commands provided to the intelligent luminaire 102. A contact list may be created in the mobile application or synched with an existing phone contact list. The intelligent luminaire 102 may be installed in the ceiling of an office conference room to save table space. Further, the intelligent luminaire 102 may enhance a user experience and user interface through the use of high configuration hardware (e.g., smart phones or tablets) and provide enhanced sound quality utilizing better speakers 138 and overhead sound transmission.

In an example, the intelligent luminaire 102 may include a selectable power-on light level scheme. The intelligent luminaire 102 (e.g., lamps or luminaires) may include a function that enables a light output to be turned off through a voice command or through a mobile application in addition to a wall switch. When an input power to the intelligent luminaire 102 resets due to a power outage, the intelligent luminaire 102 may include a recovery setting from a power outage state. In an example, an uncertainty of the recovery setting may cause inconvenience, frustration, and confusion to the user when the input power is removed and returned at undesirable times.

For example, if the intelligent luminaire 102 is designed to turn on when the input power is reset, then the user may be woken up in the middle of the night upon reestablishing power after the power outage. On the other hand, if the intelligent luminaire 102 is designed to maintain its previous state from before the power outage, a new user (e.g., a visitor) who is not familiar with the operation of the intelligent luminaire 102 will not be able to turn on the light without using the voice command or mobile application when the state before the power outage was off.

To address these issues, the intelligent luminaire 102 may include a selectable power-on light level scheme that enables the user to select or program the luminaire behavior modes upon resolution of a power outage. These modes may include but are not limited to: 1. a previous state; 2. a default state 1; 3. a default state 2; 4. a previous state before "OFF"; 5. a custom state. In one or more examples, different intelligent luminaires 102 may be programmed to different luminaire behavior modes. Further, the luminaire behavior modes may be programmed based on the cause of the power cycle. For example, if the power cycle is due to a power outage, the mode may be one of the default states. However, if the power cycle is due to a user's action, the mode may be the previous state before the power cycle. Moreover, the luminaire behavior modes may be programmed based on time of day. For example, a luminaire 102 experiencing a power outage that occurs at 2 a.m. may be programmed to remain off upon resolution of the power outage. In another example, a luminaire 102 experiencing a power outage that occurs at 7 p.m. may be programmed to return to a most recent state before the power outage.

Further, the intelligent luminaire 102 may include a system for updating software and firmware of the intelligent luminaire 102 using an over the air (OTA) scheme. In an example, the intelligent luminaire 102 provides a mechanism (e.g., the communications interface 108) for an OTA interface to a single-board computer (SBC) or main printed circuit board (PCB) of the intelligent luminaire 102 to communicate firmware updates to the processor 110 of the intelligent luminaire 102 without loading microcontroller unit (MCU) firmware separately. For example, using a specific test fixture, the SBC may pass through MCU firmware to the MCU using the OTA interface. The MCU firmware may be updated over the air similar to other devices or module firmware, such as the Wi-Fi module firmware or the SBC processor software. A UART communication and flash memory may be used to facilitate transfer of the MCU firmware from the SBC to the MCU. Further, this process may occur between the SBC and any non-volatile block of the intelligent luminaire 102.

Figure 2:
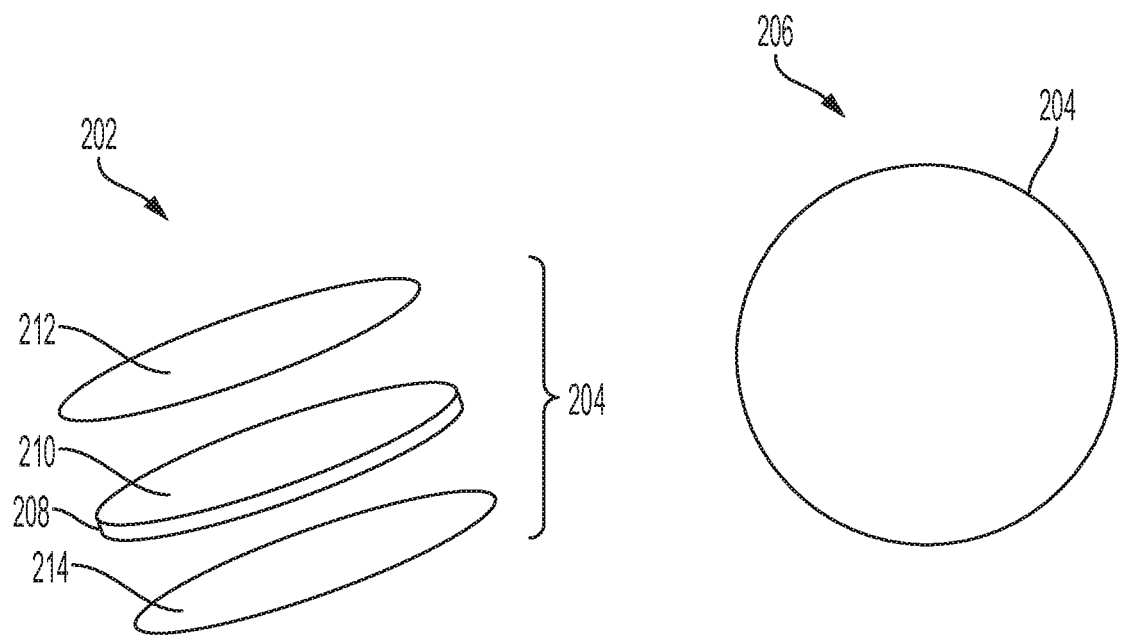
FIG. 2 depicts an exploded perspective view and an underside view of a light guide assembly, according to certain aspects of the present disclosure.

FIG. 2 is an exploded perspective view 202 of a light guide assembly 204 and an underside view 206 of the light guide assembly 204. The light guide assembly 204 may distribute light from the light sources 106 of a luminaire into a space surrounding the luminaire. The light sources 106 may include LEDs that feed light into an edge 208 of a light guide panel 210. The light guide assembly 204 may have elements that extract light from the edge 208 of the light guide assembly and direct the light out of the luminaire 102. In some examples, a reflective surface 212 is positioned behind a rear surface of the light guide panel 210 to reflect light that would normally be lost into a rear portion of a luminaire housing. The reflective surface 212 may instead direct the light through the light guide panel 210 and out of the luminaire. In one or more examples, a diffuser element 214 may be placed on a side of the light guide panel 210 that faces out of the luminaire to provide additional smoothing and evenness of the light or change the resulting luminaire distribution. The light guide assembly 204 may be described as an optical stack. In the depicted light guide assembly 204, a topmost component (i.e., the reflective surface 212) is a topmost element of the light guide assembly 204 within in the luminaire 102. The diffuser element 214 is a bottommost component of the light guide assembly 204 and is closest to a room side of the luminaire 102, and the light guide panel 210 is positioned between the reflective surface 212 and the diffuser element 214.

All three of the light guide panel 210, the reflective surface 212, and the diffuser element 214 may not be included in some examples of the light guide assembly 204. For example, the light guide assembly 204 may still function adequately without the reflective surface 212, without the diffuser element 214, or both.

Figure 3:
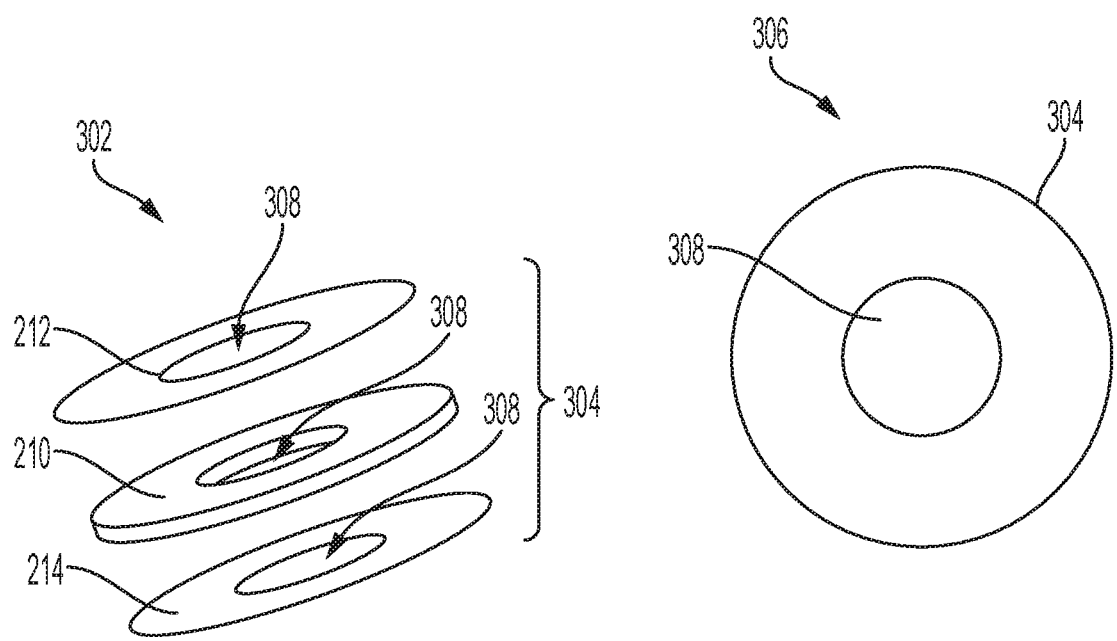
FIG. 3 depicts an exploded perspective view and an underside view of an additional light guide assembly, according to certain aspects of the present disclosure.

FIG. 3 is an exploded perspective view 302 of an additional light guide assembly 304 and an underside view 306 of the light guide assembly 304. For the speaker 138 to perform adequately, a hole 308 at least the size of a speaker diaphragm is cut in the light guide panel 210, the reflective surface 212, and the diffuser element 214. The hole 308 allows for the diaphragm to vibrate unimpeded, but the bare speaker 138 may be visible from the room through the hole 308. Speaker visibility in a central portion of the luminaire may greatly reduce the optical efficiency and visual aesthetic of the luminaire system.

Figure 4:
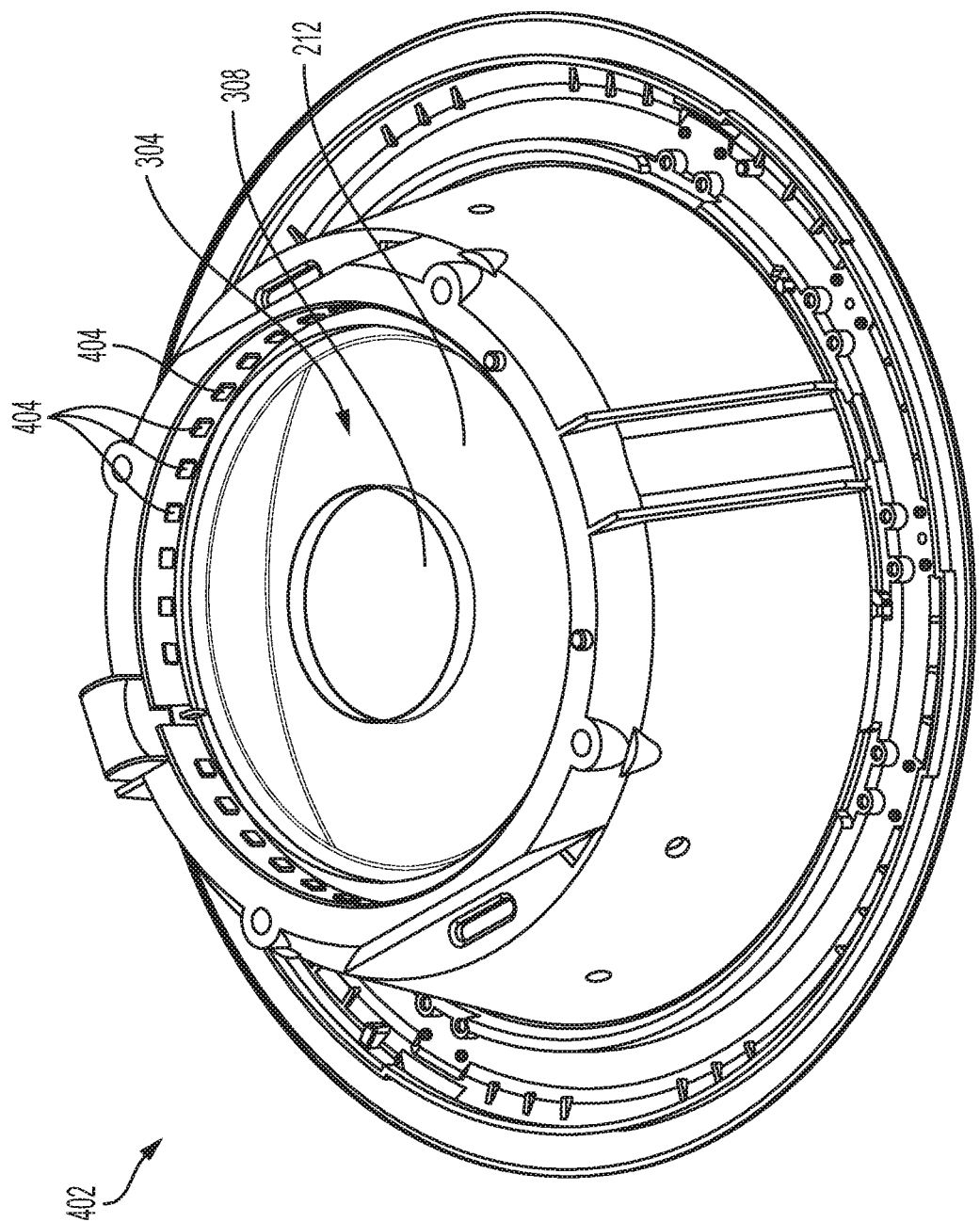
FIG. 4 depicts a perspective view of a luminaire housing including the light guide assembly of FIG. 3, according to certain aspects of the present disclosure.

FIG. 4 is a perspective view of a luminaire housing 402 including the light guide assembly 304. The speaker 138, as described above with respect to FIG. 1, may be mounted such that the speaker 138 is centered within the hole 308 of the light guide assembly 304. The reflective surface 212 of the light guide assembly 304 (e.g., a back side of the light guide assembly 304) is depicted in this view. In an example, LEDs 404, which may be the light source 106 of the luminaire housing 402, may be positioned around an edge of the light guide assembly 304 to facilitate transmission of light into the light guide assembly 304.

Figure 5:
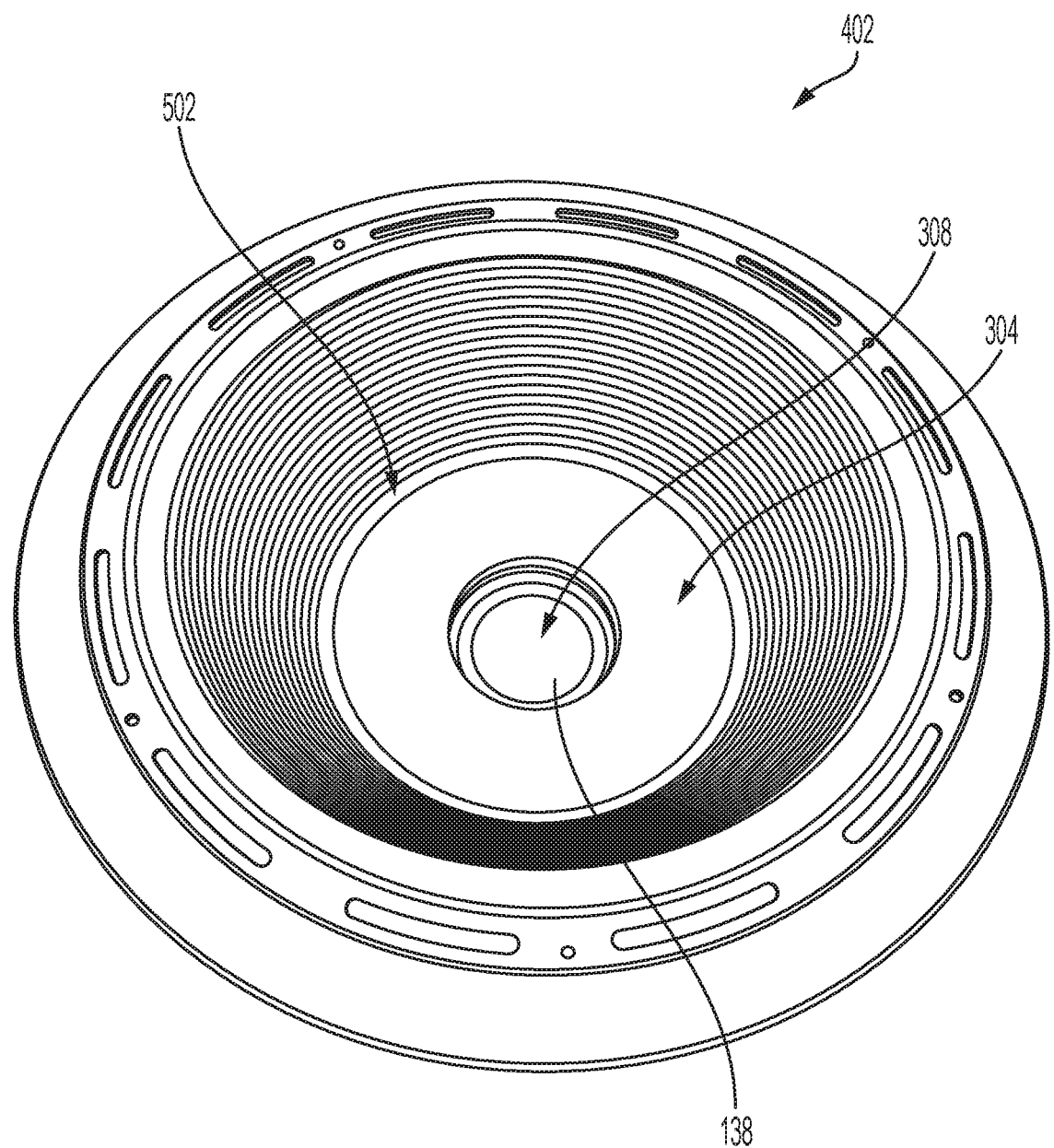
FIG. 5 depicts a perspective view of the luminaire housing of FIG. 4 including the light guide assembly of FIG. 3 from a room side of the luminaire housing, according to certain aspects of the present disclosure.

FIG. 5 is a perspective view of the luminaire housing 402 including the light guide assembly 304 from a room side of the luminaire housing 402. The depicted light guide assembly 304 includes the hole 308 cut from the light guide assembly 304 for the speaker 138 to be positioned on an opposite side of the light guide assembly 304.

In an example, an additional component may be placed between the speaker 138 and the hole 308 cut in the light guide assembly 304 (i.e., on a top side of the reflective surface 212). The additional component may generally be acoustically invisible in that the additional component enables sufficient air to pass through to allow satisfactory operation of the speaker 138. The additional component is also sufficiently reflective to allow enough light to reflect off of an area in front of the speaker 138 so that light is not lost up into a speaker housing. The reflective material may also provide a more uniform light output across a lens area 502 of the luminaire housing 402.

The features associated with the additional component (i.e., acoustically invisible and sufficiently reflective) may be achieved in several ways. One example involves the additional component being an acoustic mesh that is similar to a thin white cotton material. The mesh covers a front of the speaker 138 so that the white appearance of the mesh blends with the light guide assembly 304 to effectively hide the speaker 138 while still allowing the speaker 138 to produce sound through the mesh into the room. Materials used as screens in movie theaters are also contemplated.

In some examples, a light guide assembly of the luminaire 102 may be used as a speaker diaphragm to provide audio from the luminaire 102. For example, the light guide assembly 204, which does not include the hole 308, may be installed within the luminaire housing 402. Because anything that is placed in front of the speaker 138 detracts from an optimal performance of the speaker 138, and anything used to reflect or scatter light may not provide an identical light output to the surrounding light elements, the light guide assembly 204 may be used as the diaphragm of the speaker 138.

In one example, a luminaire without audio functionality may include the flat light guide assembly 204, which generally takes light received at the edge 208 of the light guide assembly 204 and directs the light out through a flat side of the light guide assembly 204 from the luminaire 102 into a room. In this example, adding audio functionality to the luminaire 102 may be achieved by coupling an audio producing element, such as an audio transducer, directly to the rear of the light guide assembly 204. By coupling the audio producing element to the light guide assembly 204, the light guide assembly 204 becomes a speaker without cutting the hole 308 through the light guide assembly 204 (e.g., to transmit sound waves from an external speaker component). Rather than a speaker diaphragm being an element of the speaker 138 that vibrates to create sound waves that must pass through the light guide assembly 204, the audio producing element causes the light guide assembly 204 to vibrate to generate the sound waves.

Because the light guide assembly 204 generates the audio with no physical allowances (e.g., holes cut through the light guide assembly 204) for a rear mounted speaker 138, the luminaire 102 with audio functionality would appear almost indistinguishable from a luminaire without audio functionality. Further, while a flat light guide assembly 204 is described, the light and audio element may include a shape other than flat, the light guide assembly 204 could be more or less flexible, and the light guide assembly 204 may include clear to opaque plastics or glass. These characteristics of the light guide assembly 204 may all be based on a balance of audio, lighting, and mechanical characteristics of the luminaire 102. Further, the light source 106 of the luminaire 102 in such an example may include a rear-lit architecture in one or more examples (e.g., as opposed to a side-lit or front-lit architecture).

Additional or separate audio and lighting elements may also be added to provide different frequencies. For example, one audio element (e.g., a speaker 138) mounted to the light guide assembly 204 may provide high frequencies and while a second audio element mounted to the light guide assembly 204 to produce mid frequency audio output. Other combinations of frequency output are also contemplated.

Figure 6:
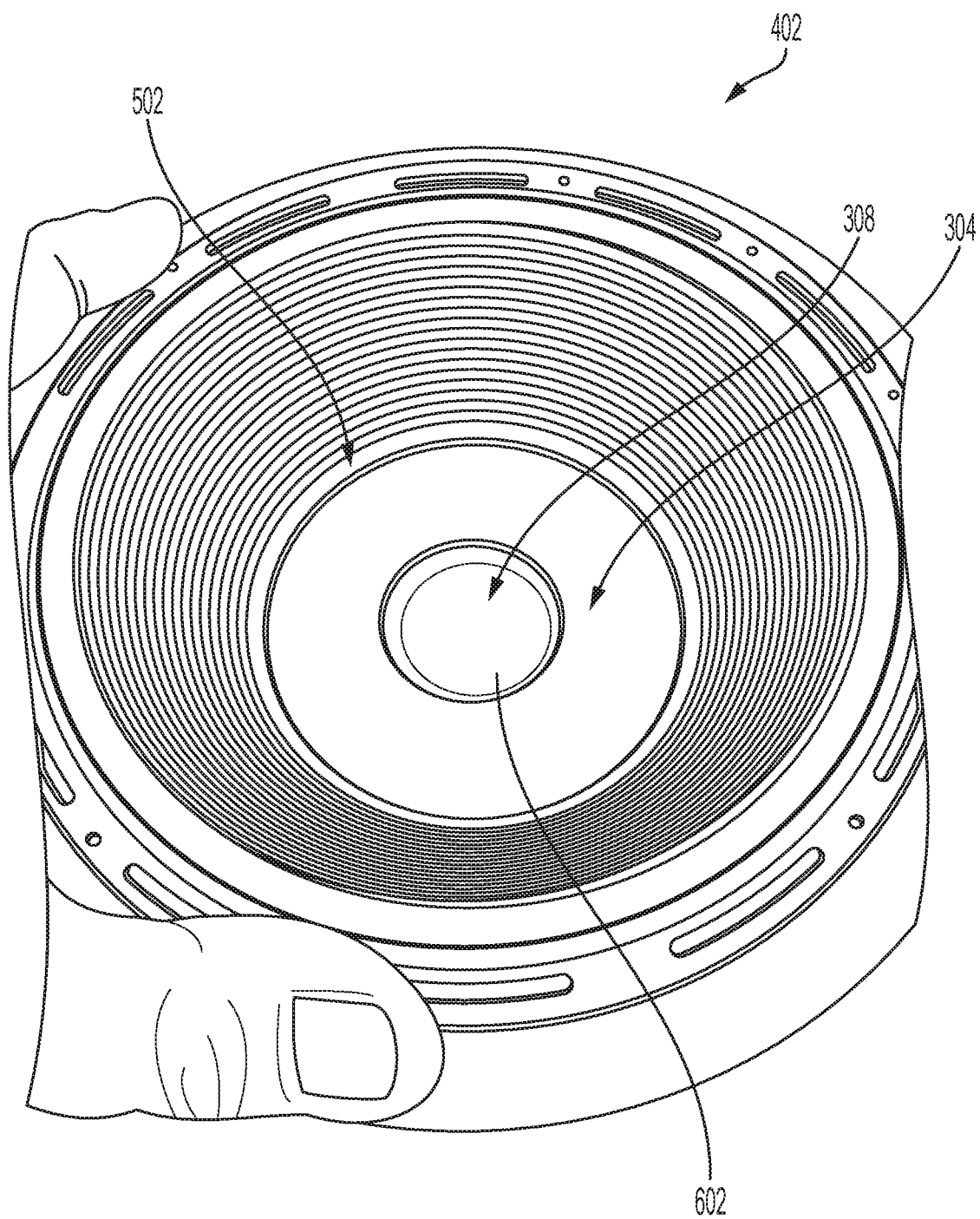
FIG. 6 depicts a perspective view of the luminaire housing of FIG. 4 including the light guide assembly of FIG. 3 and an acoustic mesh positioned within a hole of the light guide assembly, according to certain aspects of the present disclosure.

FIG. 6 is a perspective view of the luminaire housing 402 including the light guide assembly 304 and an acoustic mesh 602 within the hole 308 of the light guide assembly 304. The acoustic mesh 602 may enable the speaker 138 to function fully. Instead of a user seeing the speaker 138 in the center of the hole 308 in the light guide assembly 402, the user sees a reflected white surface that appears much more uniform across the lens area 502 than the hole 308 without the acoustic mesh 602. The acoustic mesh 602 may also bring a brightness plane in better alignment with the light guide assembly 304. Because the acoustic mesh 602 is reflective and covers the hole 308 in the reflective surface 212 of the light guide assembly 304, the light that would be lost into the speaker 138 and the luminaire housing 402 is instead reflected out of the luminaire housing 402 to improve lighting system efficiency.

Figure 7:
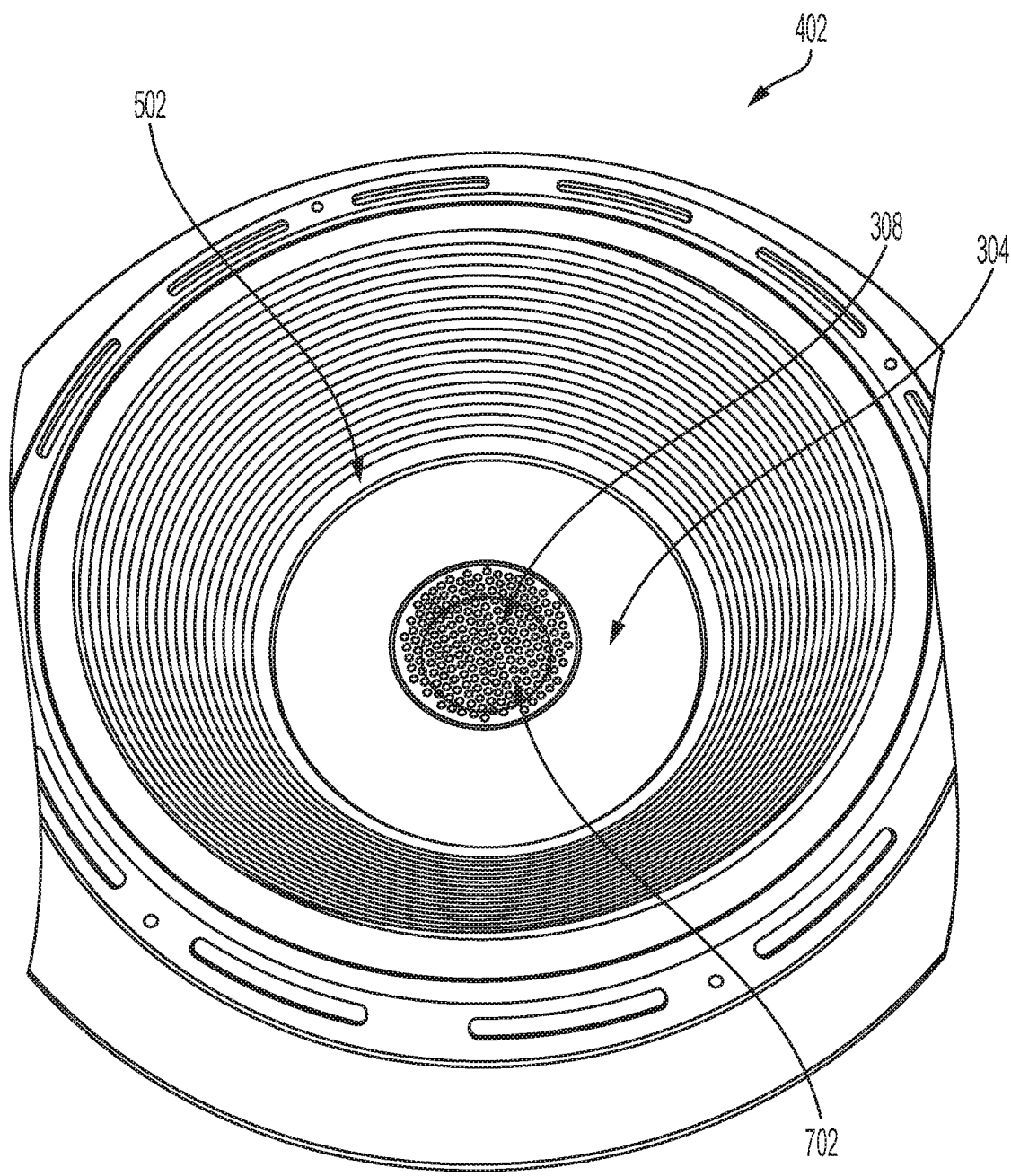
FIG. 7 depicts a perspective view of the luminaire housing of FIG. 4 including the light guide assembly of FIG. 3 and a reflective material positioned over a hole of the light guide assembly, according to certain aspects of the present disclosure.

FIG. 7 is a perspective view of the luminaire housing 402 including the light guide assembly 304 and a reflective material 702 positioned over the hole 308 of the light guide assembly 304. The reflective material 702 include many small holes cut into the reflective material 702, and the reflective material 702 may be placed over the hole 308 of the light guide assembly 212. The small holes of the reflective material 702 are positioned over the hole 308 in the light guide assembly 304. The size of the holes in the reflective material 702 may be related to a thickness of the reflective material 702, and a sufficient number of holes may be added such that the speaker 138 is able to function properly (e.g., to allow a sufficient amount of air to flow in response to an audio output of the speaker 138). In an example, the number of holes in the reflective material 702 may be determined to leave an amount of reflective material 702 capable of reflecting a sufficient amount of light from the light source 106 to create a uniform appearance at a light guide plane (e.g., a plane of the lens area 502) while maintaining optical efficiency.

Figure 8:
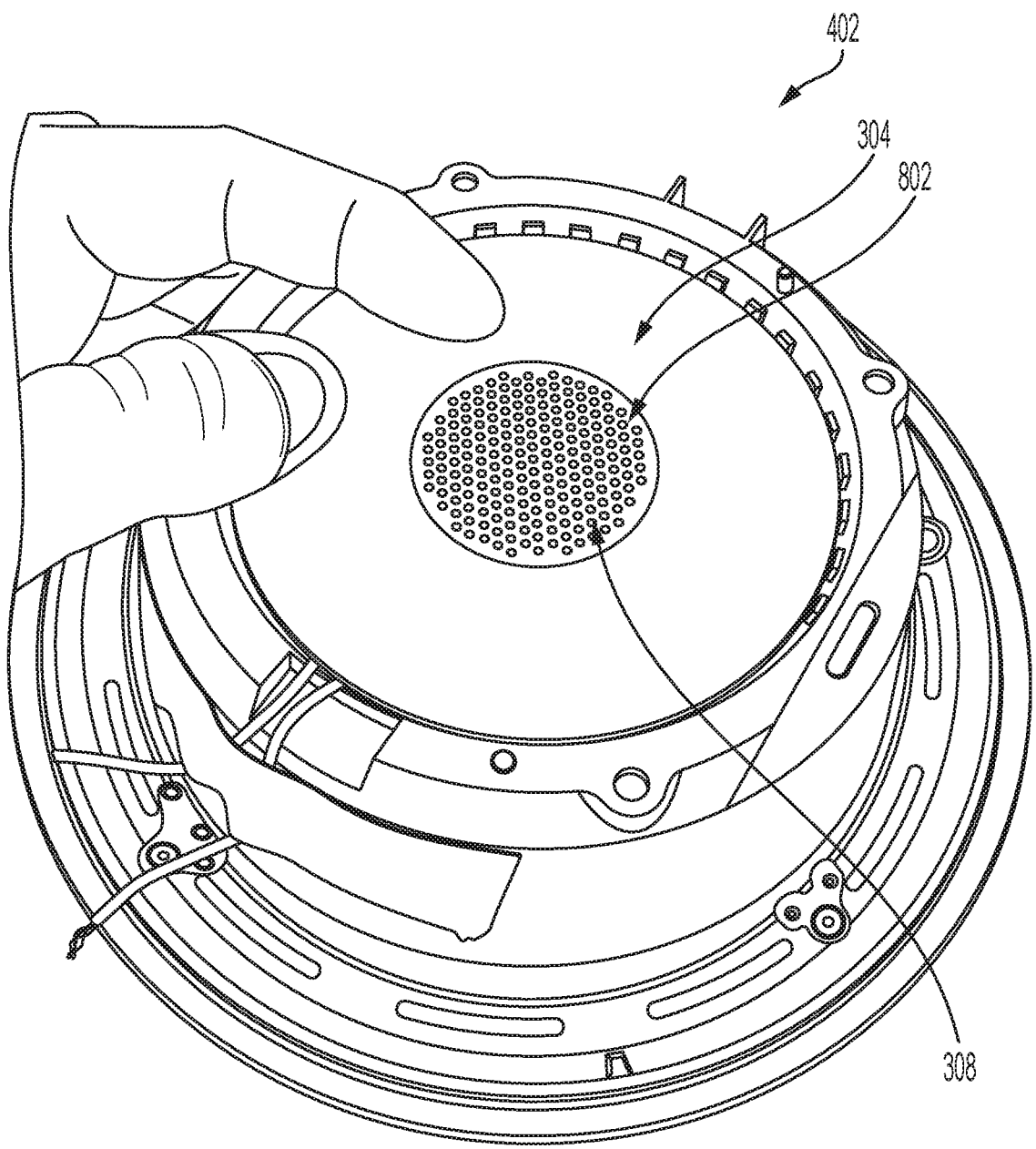
FIG. 8 depicts a perspective, ceiling-side view of the luminaire housing of FIG. 4 including the light guide assembly of FIG. 3 and a hole pattern positioned in the light guide assembly, according to certain aspects of the present disclosure.

FIG. 8 is a perspective, ceiling-side view of the luminaire housing 402 including the light guide assembly 304 and a hole pattern 802 positioned over the hole 308 of the light guide assembly 304. As illustrated, it is possible to replace a separate element (e.g., the reflective material 702) that fills the hole 308 in the light guide assembly 304 cut for the speaker 138 by cutting the hole pattern 802 directly into the light guide assembly 304. This may reduce a part count of the luminaire system while maintaining a similar functionality as the added reflective material 702 described above with respect to FIG. 7.

Figure 9:
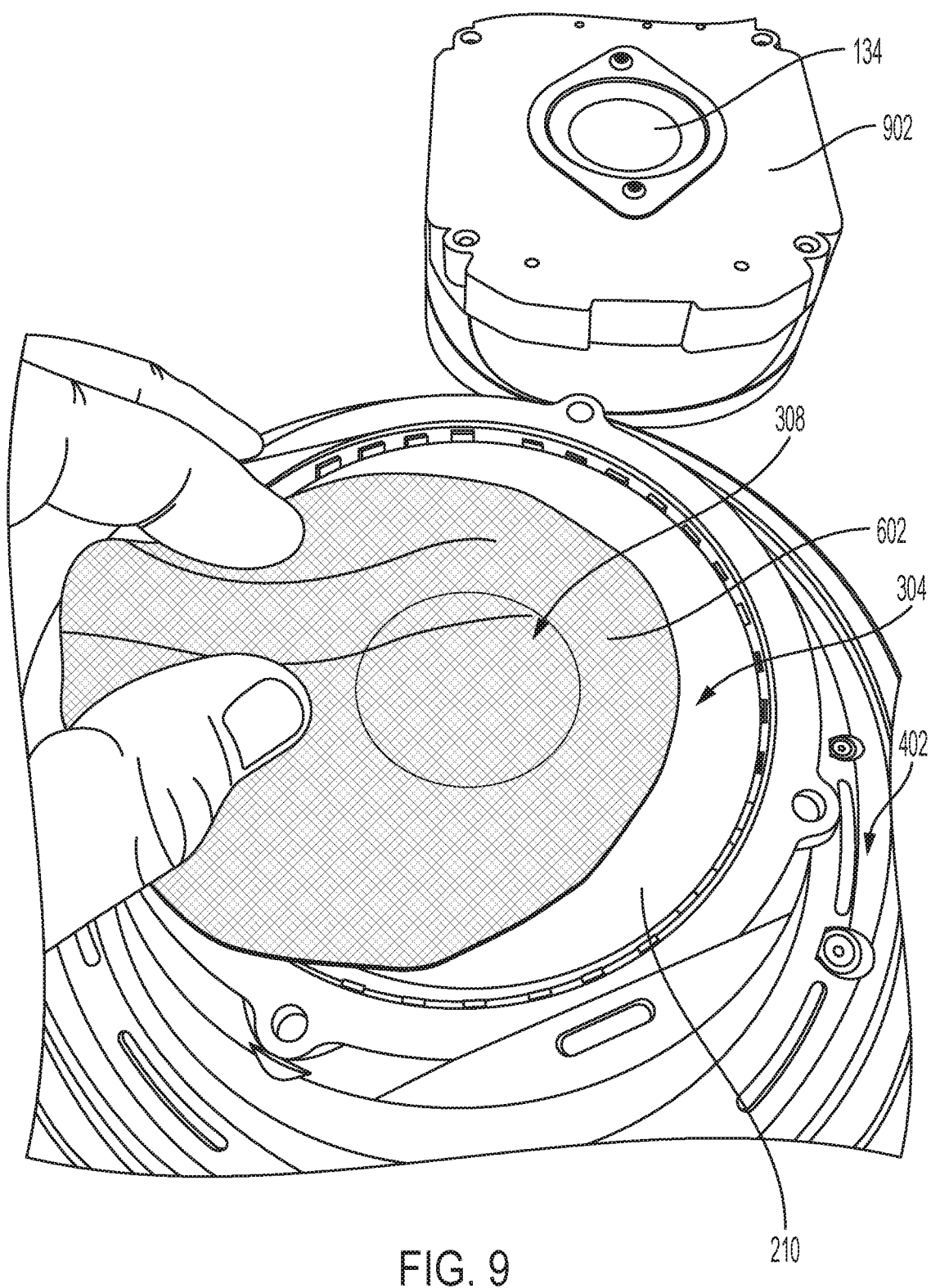
FIG. 9 depicts a perspective, ceiling-side view of the luminaire housing of FIG. 4 including the light guide assembly of FIG. 3 and a layer of acoustic mesh, according to certain aspects of the present disclosure.

FIG. 9 is a perspective, ceiling-side view of the luminaire housing 402 including the light guide assembly 304 and the acoustic mesh 602. As illustrated, the acoustic mesh 602 may extend behind the entirety of the light guide assembly 304 and replace the rear reflector 212 of the light guide assembly 304. That is, the light guide assembly 304 may include the light guide panel 210 backed by the acoustic mesh 602 instead of the rear reflector 212. This arrangement may eliminate a component in the light guide assembly 304 while maintaining the same or similar reflective backing functionality. Further, the material of the acoustic mesh 602 may be flexible and positionable behind the light guide assembly 304.

Also depicted in FIG. 9 is the speaker 138 and a speaker box 902. The speaker 138 may be arranged over the hole 308 in the light guide assembly 304 when the luminaire housing 402 is assembled prior to installation. Other speaker sizes and configurations are also contemplated for use with the luminaire housing 402.

Figure 10:
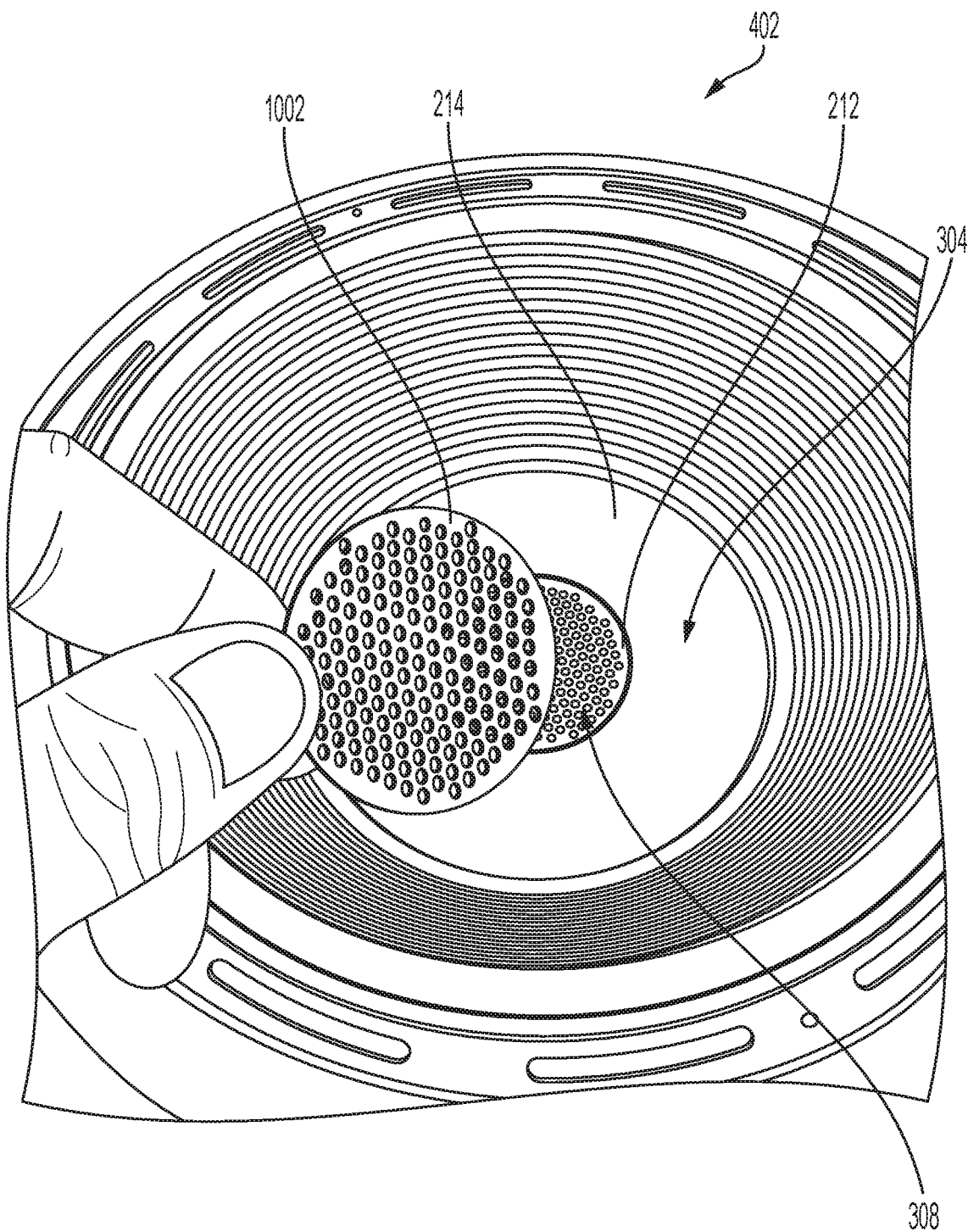
FIG. 10 depicts a perspective view of the luminaire housing of FIG. 4 including the light guide assembly of FIG. 3 and a grill element positionable over a hole in the light guide assembly, according to certain aspects of the present disclosure.

FIG. 10 is a perspective view of the luminaire housing 402 including the light guide assembly 304 and a grill element 1002 that is positionable over the hole 308 in the light guide assembly 304. Upon assembly of the luminaire housing 402, the grill element 1002 is placed over the hole 308 opening at a plane of the diffuser element 214 of the light guide assembly 304. The grill element 1002 may allow air to pass to a room from the speaker 138 to enable proper functioning of the speaker 138. Further, the grill element 1002 may more generally glow and scatter light instead of merely reflecting the light. A 'grill' shape (e.g., a hatched or lattice arrangement) of the grill element 1002 may bring a perceived brightness plane down from the reflective surface 212 of the light guide assembly 304 to the same plane as the diffuser element 214 of the light guide assembly 304.

Further, because the grill element 1002 may operate to scatter light, the grill element 1002 may have the same general appearance as the diffuser element 214 or output face of the light guide assembly 304 (e.g., by diffusing light toward the room) instead of a flat white appearance of the mesh 602 or reflective hole pattern of the reflective material 702 positioned on a speaker side of the light guide assembly 304. This scattered light from the grill element 1002 with the same general appearance as the diffuser element 214 may better convince an eye of the user of the luminaire that the speaker 138 and the hole 308 are not present in the luminaire. This may result in an appearance similar to a non-speaker luminaire.

Figure 11:
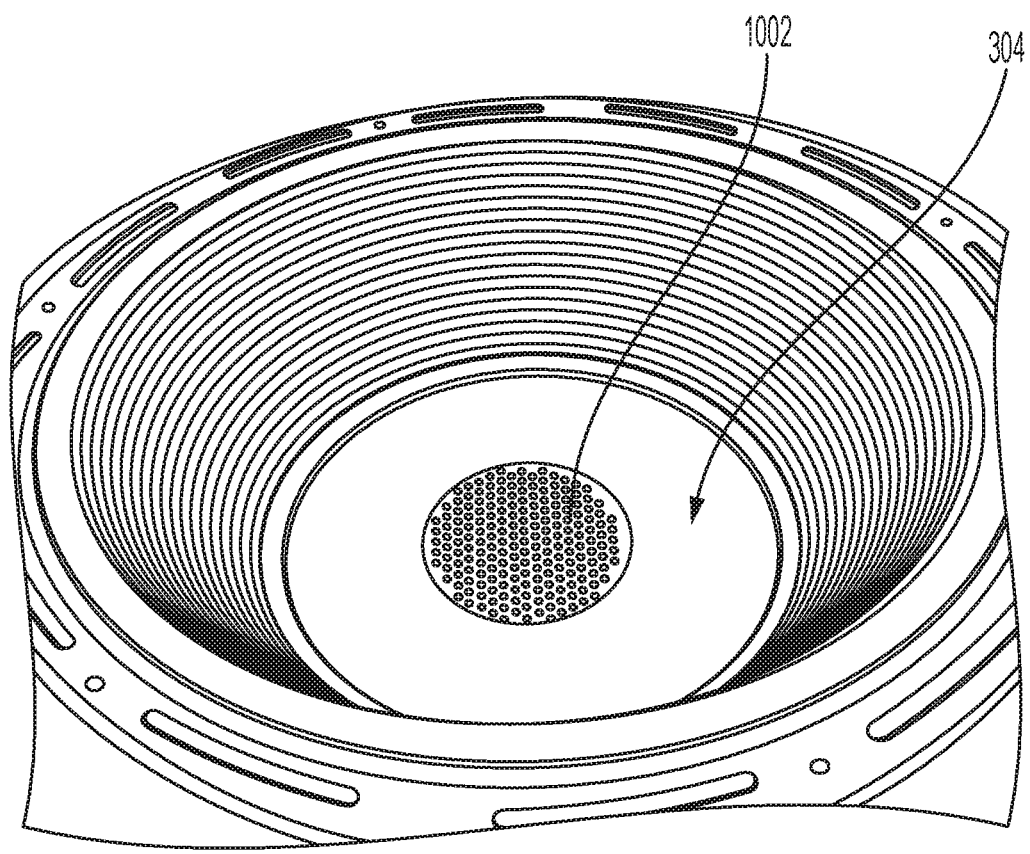
FIG. 11 depicts a perspective view of the luminaire housing of FIG. 4 including the light guide assembly of FIG. 3 and the grill element installed over a hole in the light guide assembly, according to certain aspects of the present disclosure.

FIG. 11 is a perspective view of the luminaire housing 402 including the light guide assembly 304 and the grill element 1002 installed over the hole 308 in the light guide assembly 304. The grill element 1002 may be used with any of the described rear reflected light guide assemblies 304 described above. Further, the diffuser element 214 and the reflective surface 212 may be optional components of the light guide assembly 304 when the grill element 1002 is used with the light guide assembly 304.

Figure 12:
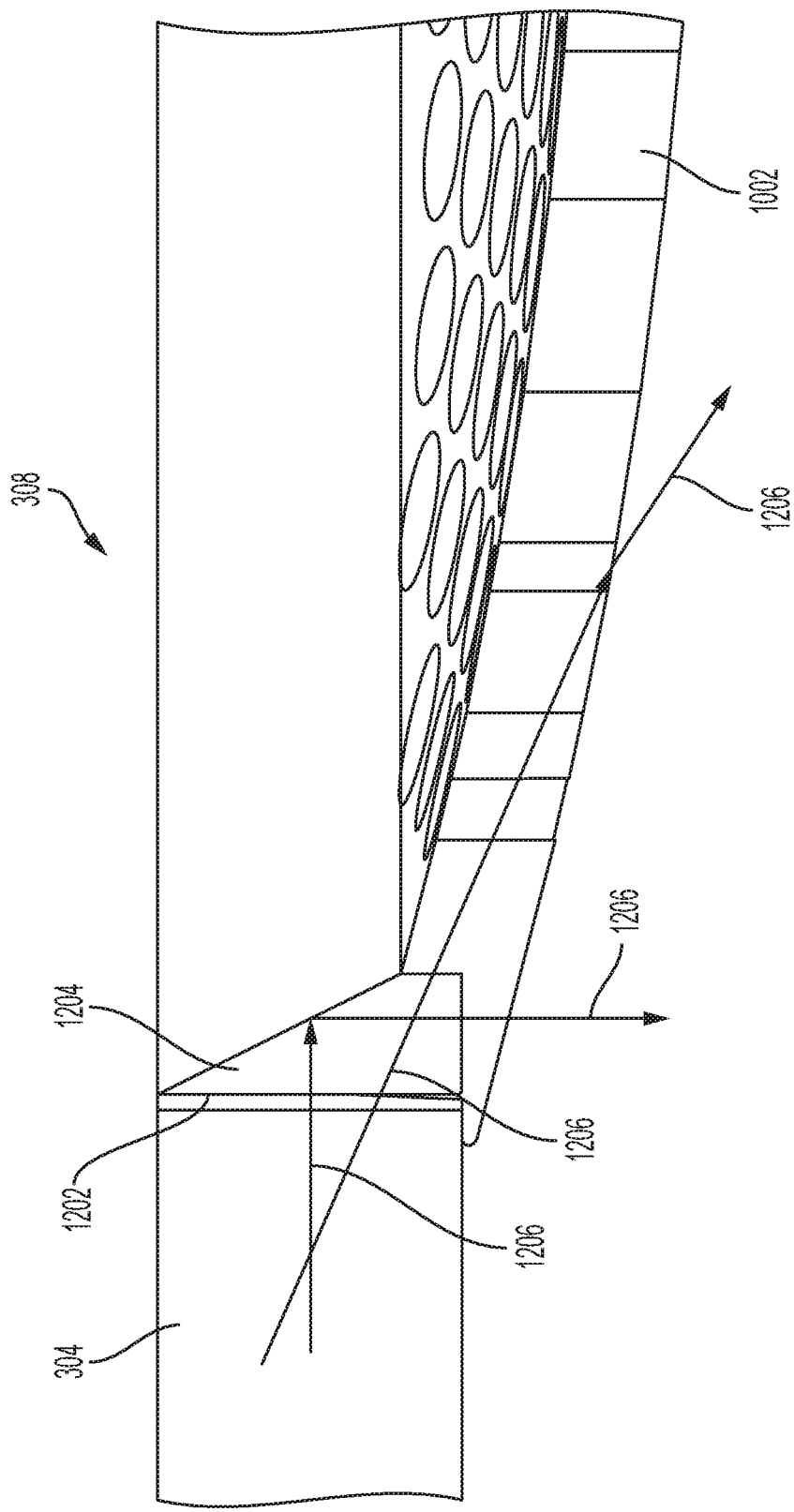
FIG. 12 depicts a side sectional view of a portion of the light guide assembly of FIG. 3 and the grill element of FIG. 10 installed within a hole in the light guide assembly, according to certain aspects of the present disclosure.

FIG. 12 is a side sectional view of a portion of the light guide assembly 304 and the grill element 1002 installed within the hole 308 in the light guide assembly 304. In an example to achieve the desired light output look of the luminaire involves integrating the functionality of the acoustic mesh 602 or the hole pattern of the reflective surface 212 with the front scattering grill element 1002. Portions of the grill element 1002 may extend into the hole 308 cut into the light guide assembly 304 for the speaker 138. Any light in the light guide assembly 304 that exits through a surface 1202 of the hole 308 that would otherwise be reflected into the room using the described reflective elements (e.g., by the acoustic mesh 602) may instead be collected by the grill element 1002 and scattered into the room through a diffuser plane of the grill element 1002. In this case the light is transferred into the grill element 1002 instead of toward the speaker 138, and the light is extracted and transmitted in a controlled manner toward the room and out of the luminaire. Arrows 1206 provide an indication of possible paths of the light transfer from the light guide assembly 304, to the grill element 1002, and into the room. This may result in greater uniformity across the entirety of the light pipe grill element 1002. Further, this installation of the grill element 1002 has the benefit of not relying on a reflective surface in the hole 308 between the speaker 138 and the light guide assembly 304 while maintaining the lighting system efficiency at a high level. An extension element 1204 may be added to the grill element 1002 to extend the grill element 1002 into the hole cut 308 of the light guide assembly 304. The grill element 1002 and the added extension element 1204 may be a single component, or the grill element 1002 and the added extension element 1240 may be separate combinable components.

Figure 13:
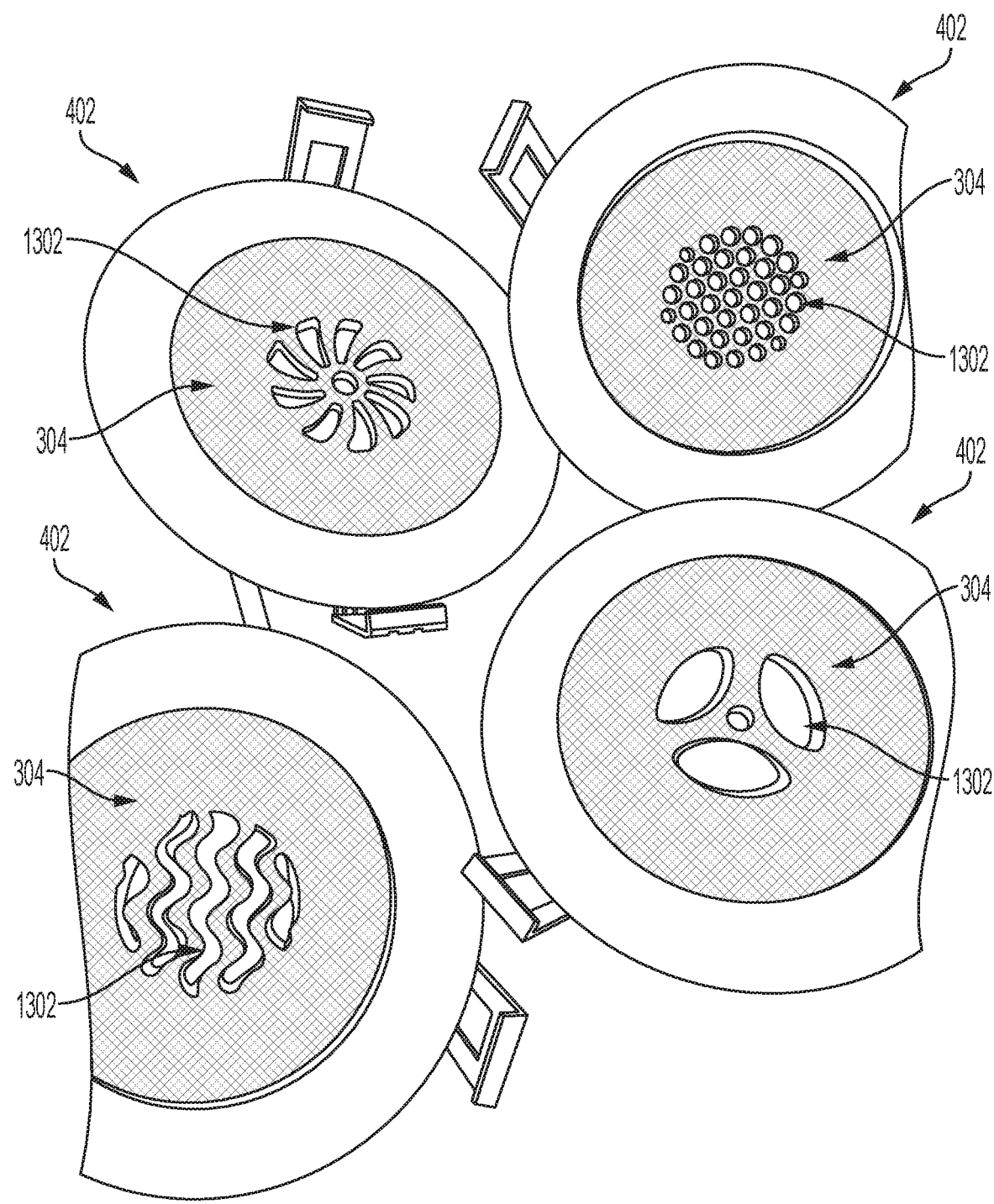
FIG. 13 depicts an underside view of various luminaire housings with light guide assemblies that include integrated light pipe grills, according to certain aspects of the present disclosure.

FIG. 13 illustrates underside views of various luminaire housings 402 with the light guide assemblies 304 that include integrated light pipe grills 1302. As illustrated, the hole 308 would not be cut into the light guide assembly 304, and the light guide assembly 304 may instead be molded with this light pipe grill 1302 in place. This example may eliminate a component and remove an air gap between the light guide assembly 304 and the light pipe grill 1302 that can contribute to system efficiency losses.

FIG. 13 provides some examples of how the light pipe grill 1302 and the light guide assembly 304 are combined to help hide the speaker 138. The illustrated light guide assemblies 304 were made using a blank sheet of light guide material and cutting the shapes depicted by the light pipe grill 1302 into the light guide material. By including a single continuous light guide assembly 304 that covers the speaker 138, the light emitting area extends across the luminaire to create a more uniform look while allowing for air movement from the speaker 138. The illustrated designs of the light pipe grills 1302 may be further improved by adding a diffuser with a similar pattern to the light pipe grills 1302 cut into the diffuser, using some of the rear reflection techniques (e.g., the acoustic mesh 602 or holes in the reflective surface 212) described above with a single hole 308 to further hide the speaker, or any combination thereof. The illustrated designs also provide an indication that the pattern cut into the light guide material is not limited to a single hole or a single design of an array of holes. Decorative patterns of the light pipe grill 1302 may provide varying aesthetic results such as wavy lines, flowers, logos, and any other shape so long as a sufficient amount of air is allowed to move to provide satisfactory audio performance from the speaker 138 (e.g., as long as the light pipe grill 1302 is acoustically transparent).

Figure 14:
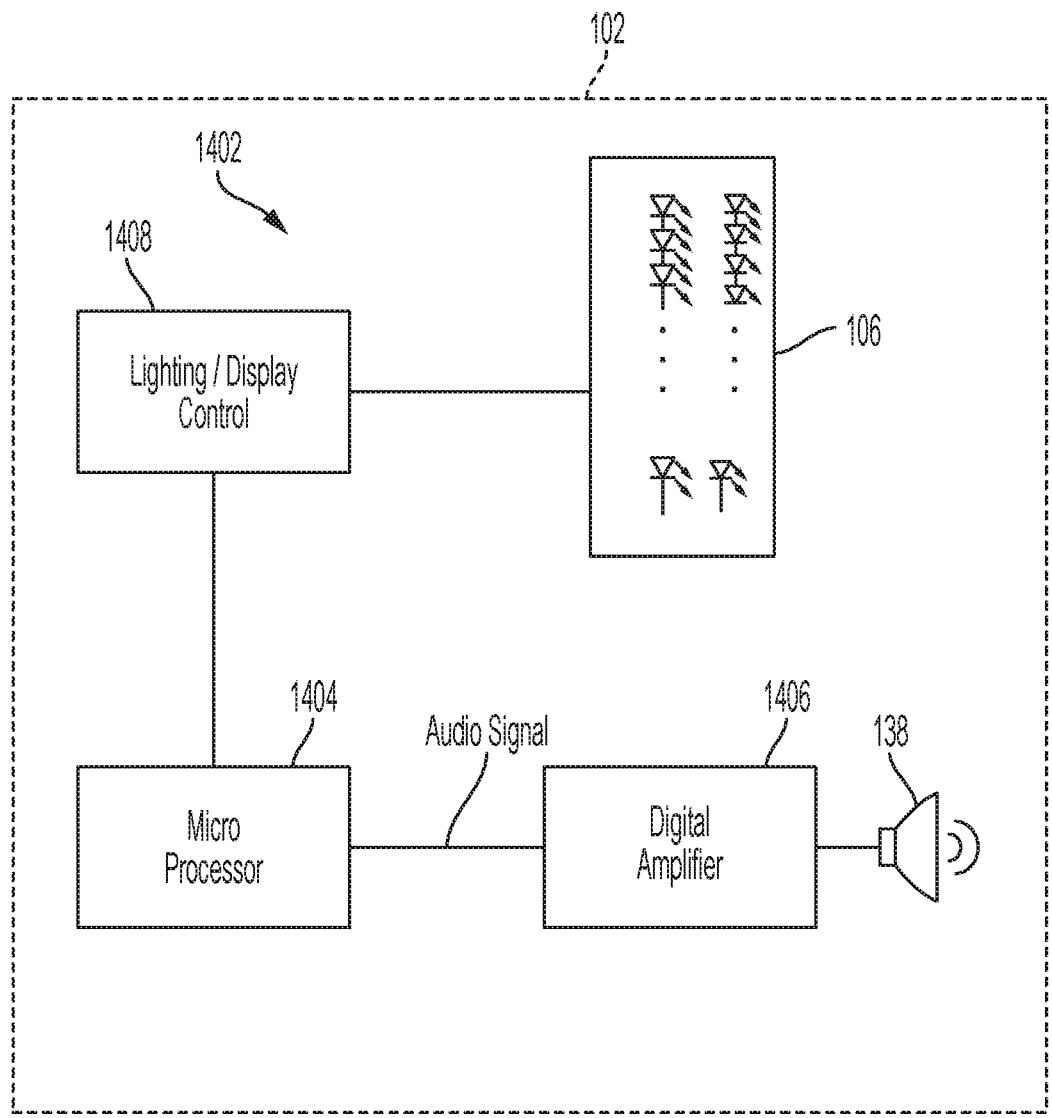
FIG. 14 depicts a schematic diagram of a control system to reduce light variance in the luminaire of FIG. 1 due to vibration originating from the speaker of FIG. 1 within the luminaire, according to certain aspects of the present disclosure.

FIG. 14 is schematic diagram of a control system 1402 to reduce light variance in the luminaire 102 due to vibration originating from the speaker 138 within the luminaire 102. For example, when there is vibration at the luminaire 102 resulting from audio output by the speaker 138 within the luminaire 102, flicker or shimmer of the light source 106 may result from the vibration.

In certain examples, the vibration patterns causing the flicker or shimmer of the lighting element are predictable. For example, when the vibration is caused by the speaker 138, audio source information of the sound output by the speaker 138 may be accessed. By accessing the audio source information, the vibration pattern of the luminaire 102 based on the audio associated with the audio source information may be predictable. Accordingly, an intensity of the light source 106 and a beam pattern of the light source 106 may be adjusted to compensate for the variance of the light (e.g., the flicker or shimmer) due to the vibration. This compensation may be performed according to a compensation algorithm provided by a transfer function. The transfer function may include an input of the audio frequency and an output of current levels provided to the light source that achieves a steady lumen output during the audio output of the speaker 138 within the luminaire 102.

As illustrated, a microprocessor 1404 controls the light source 106 of the luminaire 102 based on the audio source information. The microprocessor 1404 also controls a digital amplifier 1406 that controls the audio output from the speaker 138 within the luminaire 102. In an example, the microprocessor 1404, or another processing device, is able to analyze the audio source information, perform a compensation algorithm on the audio source information, and control the lighting output (e.g., using a lighting/display controller 1408) to a steady lumen output based on the compensation algorithm.

Figure 15:
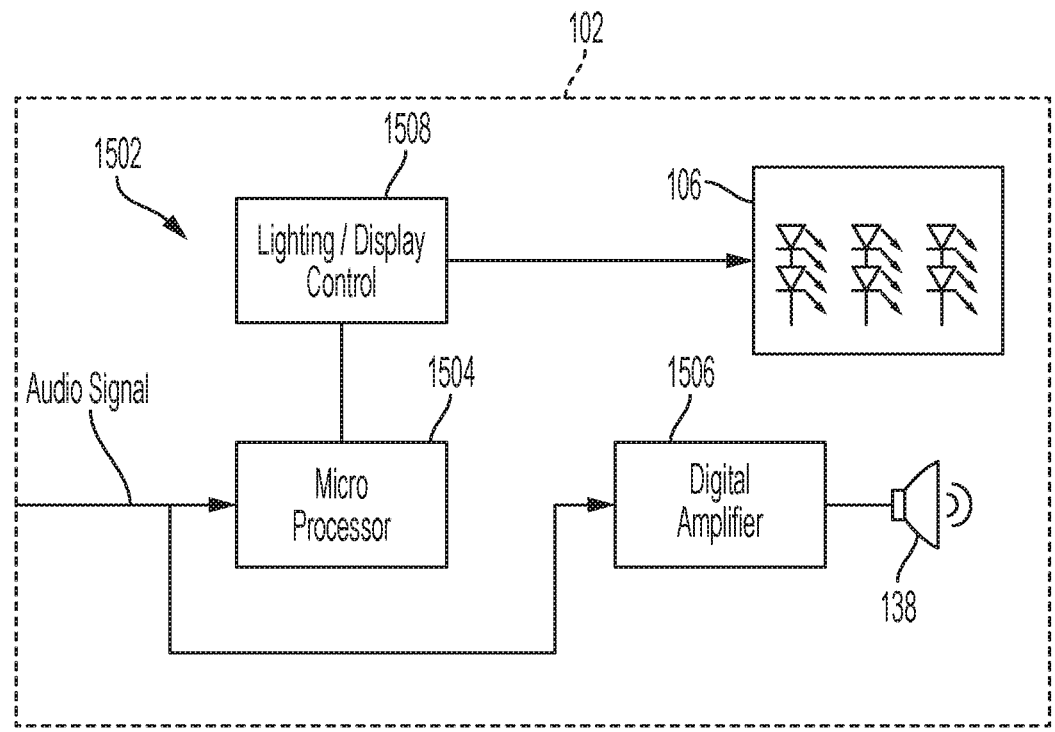
FIG. 15 depicts a schematic diagram of an additional control system to reduce light variance in the luminaire of FIG. 1 due to vibration originating from the speaker of FIG. 1 within the luminaire, according to certain aspects of the present disclosure.

FIG. 15 is a schematic diagram of an additional control system 1502 to reduce light variance in the luminaire 102 due to vibration originating from the speaker 138 within the luminaire 102. As illustrated, the audio signal is provided to both a microprocessor 1504 and a digital amplifier 1506. The digital amplifier 1506 converts the audio signal into a signal usable by the speaker 138 of the luminaire 102 to produce an audio output. Further, the microprocessor 1504 analyzes the audio signal, performs a compensation algorithm on the audio signal, and controls the lighting output of the light source 106 (e.g., using the lighting/display controller 1508) to a steady lumen output based on the compensation algorithm.

Figure 16:
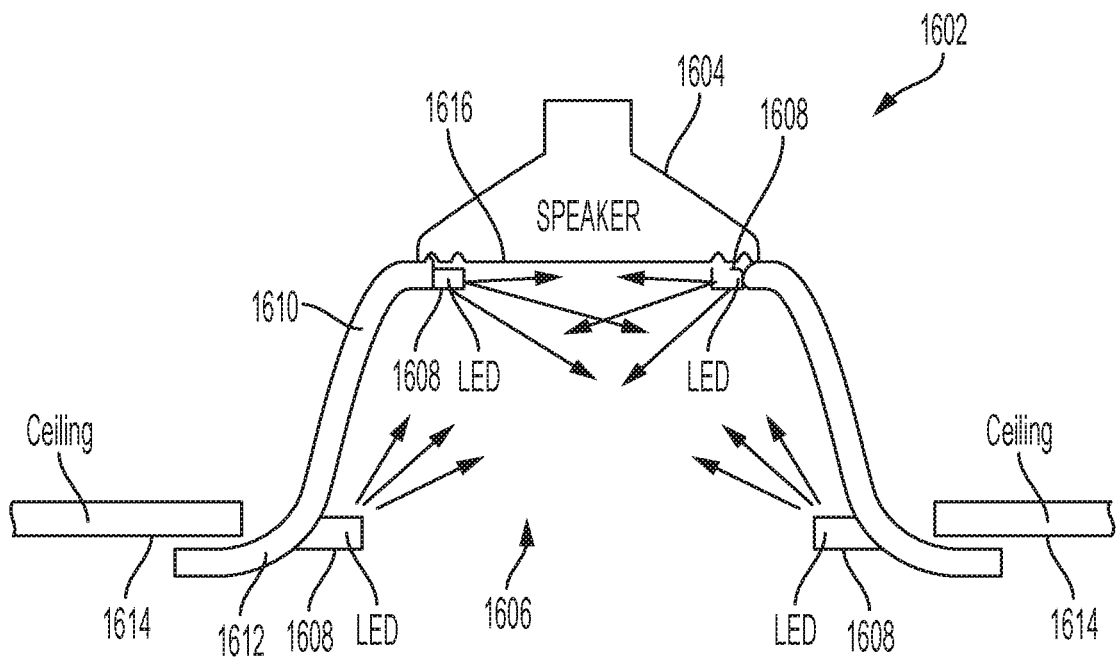
FIG. 16 depicts a schematic, sectional view of a luminaire with a recessed speaker and pseudo downlighting, according to certain aspects of the present disclosure.

FIG. 16 is a schematic, sectional view of a luminaire 1602 with a recessed speaker 1604 and pseudo downlighting 1606. As illustrated, the luminaire 1602 includes the speaker 1604 mounted into a recessed lighting can that matches the aesthetics of a recessed downlight, such as the luminaire housing 402 described above with respect to FIG. 4, positioned in the same room as the luminaire 1602. The luminaire 1602 with the speaker 138 may provide limited illumination (i.e., the pseudo downlighting 1606) using lighting elements 1608 positioned on a baffle 1610 and trim 1612 of the luminaire 1602 positioned against a ceiling surface 1614, but the luminaire 1602 provides minimal actual downlighting into the user environment when compared to downlights with a similar appearance. That is, the luminaire 1602 functions primarily as the speaker 1604 with limited illumination. In an example, the luminaire 1602 produces a pseudo downlight effect that provides an appearance of downlighting due to a consistent aesthetic on the ceiling 1614, but the primary function of the luminaire 1602 is to provide superior audio quality due to a much larger speaker 138 than a similar light with an integral speaker.

In-ceiling speakers may offer an aesthetic look that is dissimilar to a typical downlighting element. The luminaire 1602 recesses the speaker 138 and provides an aesthetic look that is similar to a recessed downlight by providing a minimal amount of uplighting illumination that focuses on illuminating the recessed speaker 138 and the baffle 1610 instead of illuminating a user environment. By matching the aesthetic look of nearby downlights, the user is able to experience enhanced sound quality from the larger speaker 138 while also experiencing the continuous aesthetic look and feel of downlighting throughout the user environment.

In this example, a speaker diaphragm 1616 may be maximized within the luminaire 1602 to optimize the sound quality of the speaker 138. Additionally, the speaker diaphragm 1616 may be located at a proper depth within the luminaire can and illuminated in a manner to give the perception that the speaker 138 is actually an optical lens used in recessed downlighting. By providing uplighting, grazing effects, or other lighting effects, the speaker diaphragm 1616 may be illuminated to mimic the appearance of a recessed downlight lens. Similarly, the cone or baffle 1610 of the luminaire 1602 may also be illuminated to give the appearance of a downlighting fixture.

Figure 17:
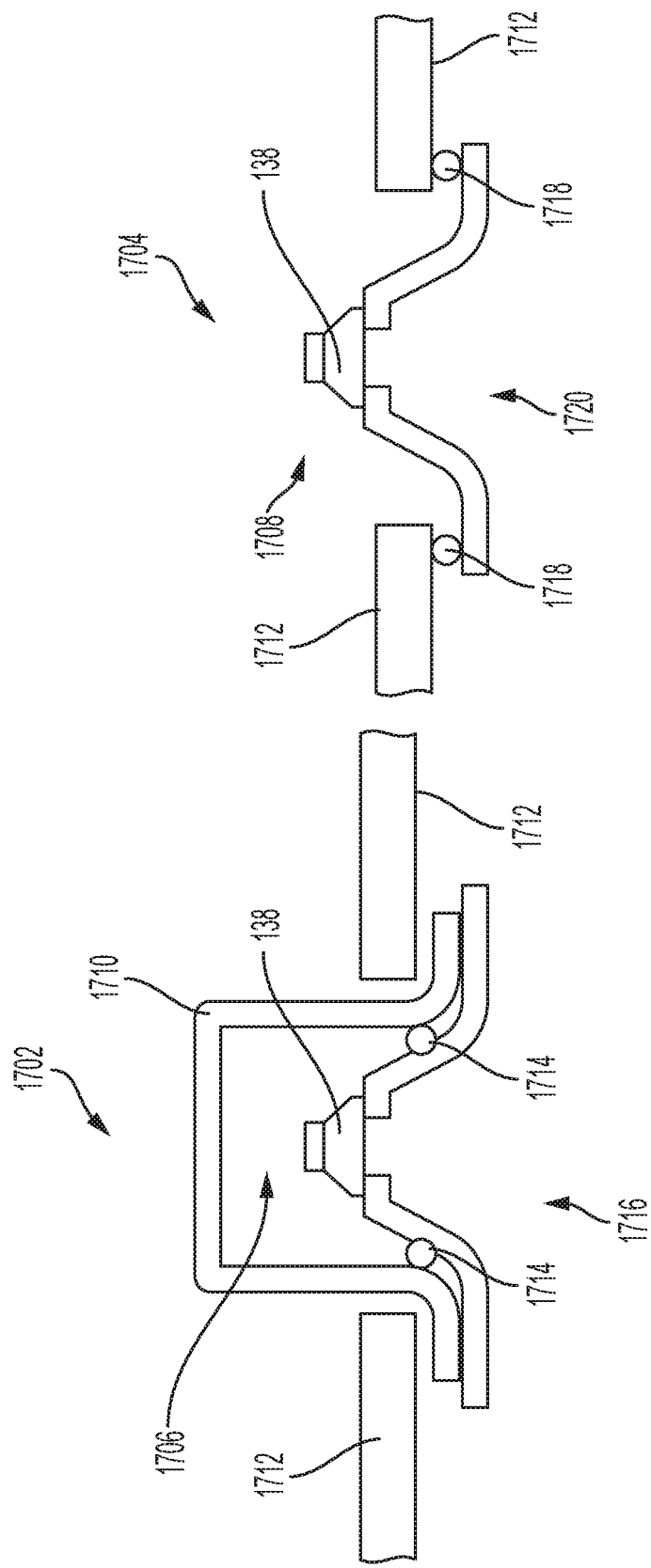
FIG. 17 depicts a schematic, sectional view of retrofits of a luminaire with recessed speakers, according to certain aspects of the present disclosure.

FIG. 17 is a schematic, sectional view of retrofits of a luminaire 1702 or 1704 with recessed speakers 138. In an example, the luminaire retrofits rely on an existing can 1710 or plenum (e.g., an area above a ceiling 1712 for the luminaire 1704) volume of a downlighting element (e.g., the luminaire 102) to function as a speaker back volume 1706 or 1708 for a luminaire 1702 or 1704 that includes a speaker 138. The existing can 1710 or plenum may take the place of a dedicated secondary back volume component (i.e., a speaker box) of the speaker 138.

Speaker light concepts may use a dedicated secondary component as the back volume for the speaker (e.g., a dedicated speaker box). The secondary component may add extra costs to production of the speaker within the luminaire 102. Additionally, the volume of space created by the secondary component back volume may limit a design engineer's ability to package all components in a design without creating interferences with other system components. As a result, the volume (i.e., cubic inches) of the speaker box is potentially reduced to create enough space for other components. Reducing the volume below a certain threshold may lead to diminished audio quality.

One or more examples may be used to rectify the issues described above. In a first example, the can 1710 of the luminaire 1702 is typically installed in conjunction with a speaker light element that is designed as a retrofit product. This existing can 1710 is inherently a large volume of space that can function as a back volume for the speaker 138. The can 1710 may be properly sealed using a seal 1714 that compartmentalizes the back volume 1706 from a front volume 1716 of the speaker 138. Upon sealing the can 1710 using the seal 1714 (e.g., a gasket or similar material to partition the two volumes of air), the can 1710 then functions as the back volume 1706 for the speaker 138.

In a second example, an alternate construction for retrofit system speaker lights includes a "wafer" style construction. In the wafer style construction, a can is not utilized to install the luminaire 1704. Instead, the luminaire 1704 is installed directly into an open ceiling plenum. The ceiling plenum may include a large volume of space above the ceiling 1712. By adding a seal 1718 (e.g., a gasket or similar material to partition the two volumes of air) between the luminaire 1704 and the ceiling 1712, a conditioned side of the room is the speaker front volume 1720, and an unconditioned plenum becomes an "infinitely large" back volume 1708 for the speaker 138. Given the principle of speaker design for an "open" speaker concept, if a large barrier (e.g., the ceiling 1712) separates the front and back volume, the dedicated back volume 1708 can be "open" and not officially sealed, as the physics of the design causes the speaker 138 to function as if a dedicated back volume exists.

Figure 18A:
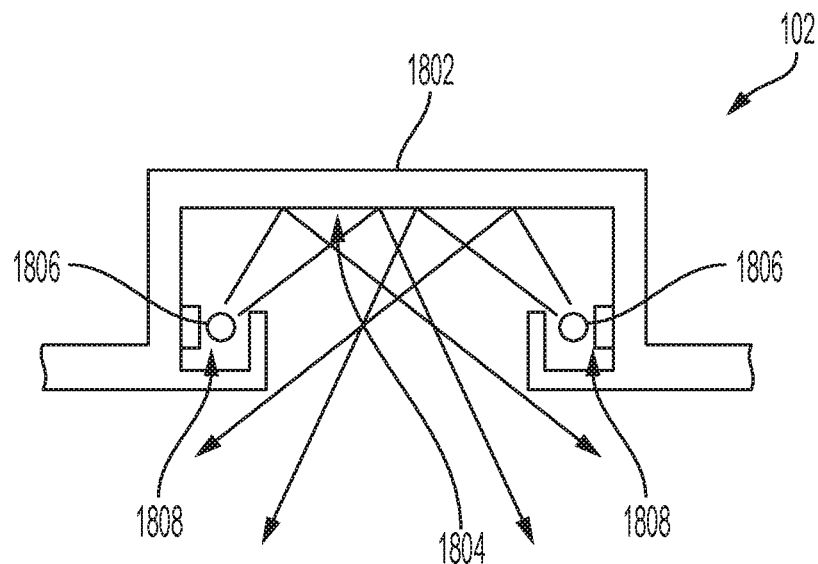
FIGS. 18a and 18b depict examples of sectional, schematic views of luminaires with indirect downlighting, according to certain aspects of the present disclosure.
Figure 18B:
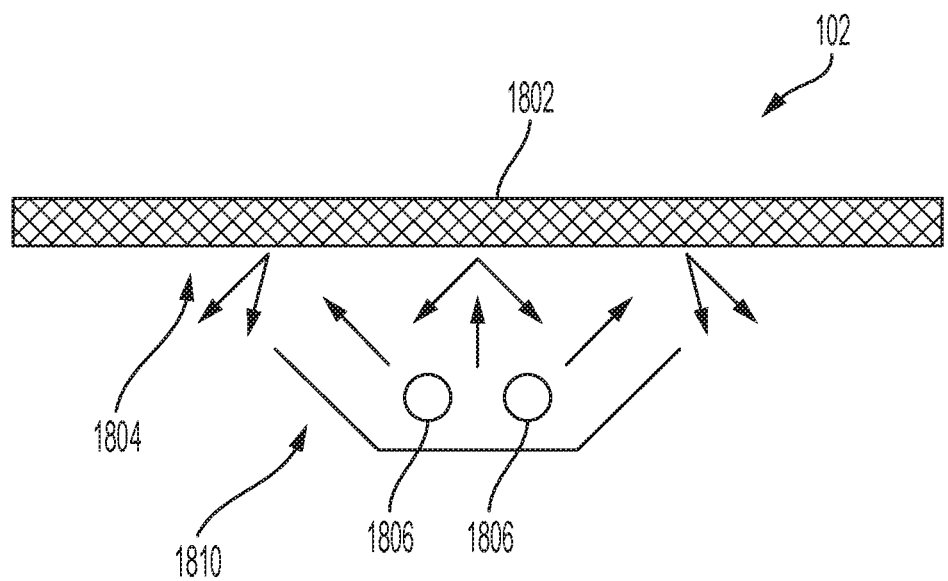

FIGS. 18*a* and 18*b* are examples of sectional, schematic views of luminaires 102 with indirect downlighting. The presently disclosed subject matter makes use of a speaker diaphragm 1802 as an indirect reflector to become at least part of the light emitting surfaces 1804. In an example, the indirect lighting elements 1806 may be used in a coffered light recess 1808 design or a fluorescent troffer design 1810.

In an example, the indirect lighting elements 1806 are directed upward (e.g., in a direction away from a conditioned side of a ceiling or wall by aiming the light source, or through a primary reflective or a total internal reflection (TIR) refractive element), and a reflective element is located to redirect the light downward and out of the luminaire (e.g., toward a conditioned side of the ceiling or wall in a room). In one or more examples, the speaker diaphragm 1802 may be placed within this down facing reflective element, or the speaker diaphragm 1802 may become the entire reflective element.

Figure 19:
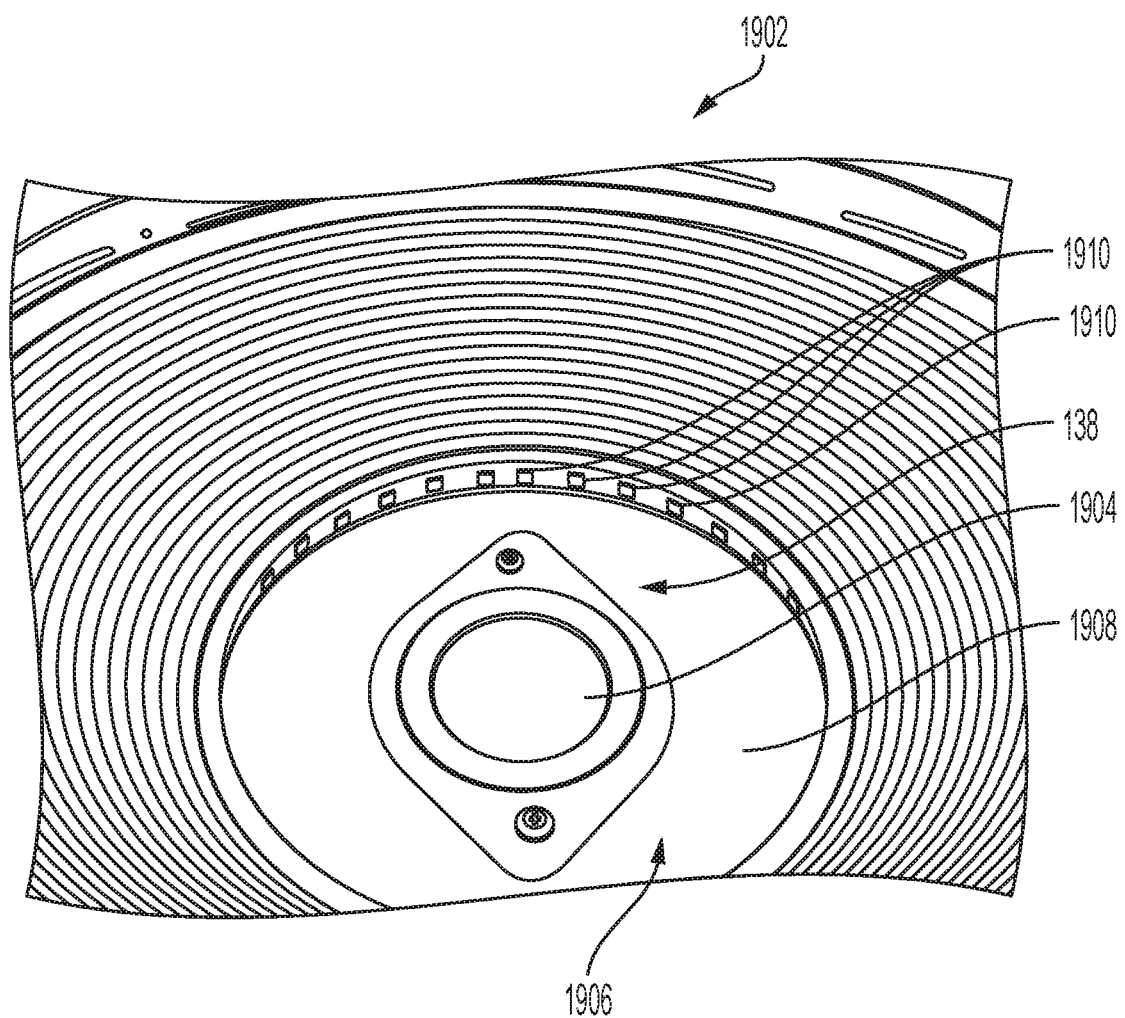
FIG. 19 depicts a perspective, underside view of a luminaire housing with indirect downlighting, according to certain aspects of the present disclosure.

FIG. 19 is a perspective, underside view of a luminaire housing 1902 using indirect downlighting. A speaker diaphragm 1904 of the speaker 138 may be used as part of a downward reflective element 1906. By removing the light guide assembly 304 from the luminaire housing 1902, the entire speaker diaphragm 1904 and speaker box 1908 are exposed.

LEDs 1910, which were mounted in the luminaire housing 1902 to transmit light into the light guide assembly 304, may direct half of their light upward toward the speaker diaphragm 1904 and the surrounding speaker box 1908 and the other half of their light downward out of the luminaire housing 1902. The LEDs 1910 of the present example may be arranged in a similar manner to those used with the light guide assembly 304, and an optical element (e.g., a coffer (not shown)) may be added that takes the light that would have gone downward and out of the luminaire housing 1902, and redirects the light toward the speaker diaphragm 1904 and the speaker box 1908.

Figure 21:
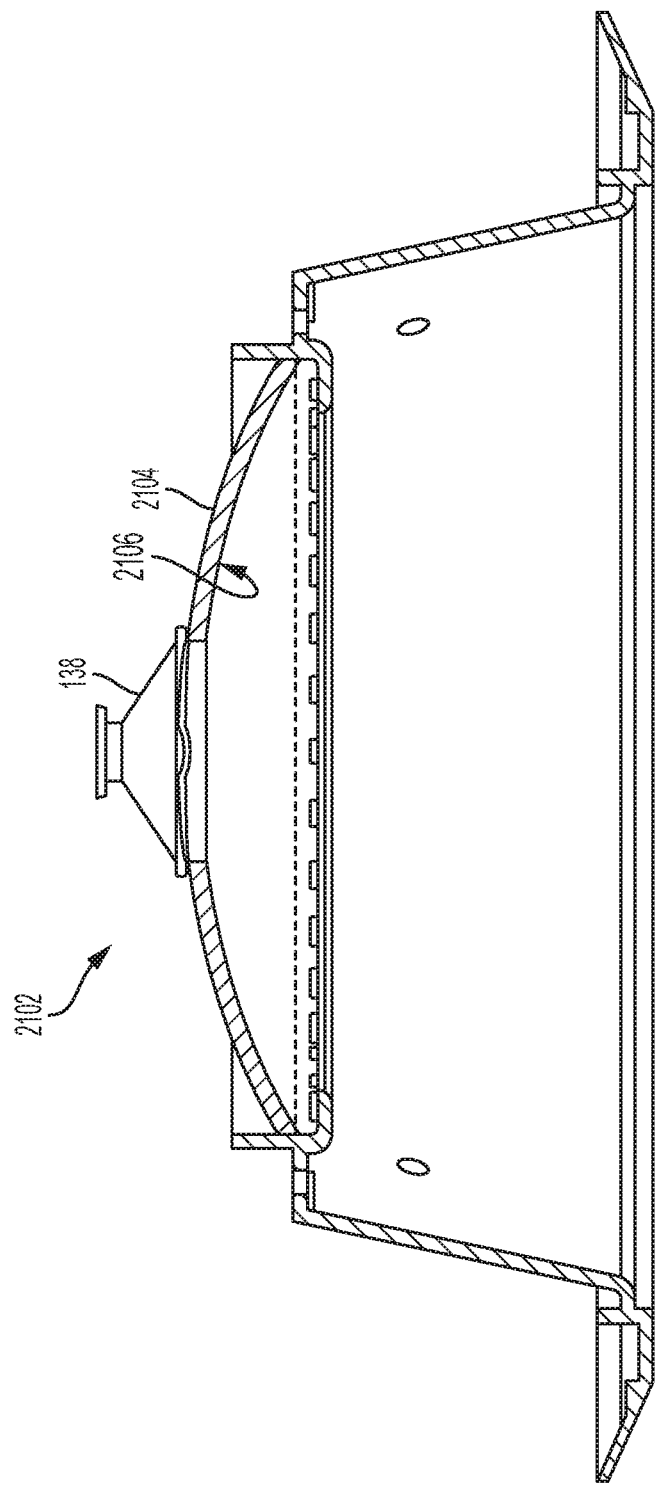
FIG. 21 depicts a sectional view of a luminaire housing including a speaker and a shaped speaker box surrounding the speaker, according to certain aspects of the present disclosure.

In another example, the LEDs 1910 may be mounted 90 degrees from the position depicted above such that the LEDs are generally aimed directly toward the speaker diaphragm 1904 and the speaker box 1908, as depicted in FIG. 21 below. In such an example, light that would be directed away from the speaker plane (i.e., generally outward into a room) may be redirected toward the speaker plane with a reflective or refractive element to improve efficiency. An additional ledge may also be added around where the LEDs 1910 are mounted to block direct view of the LEDs 1910 from the user (e.g., providing a coffered arrangement of the LEDs).

Figure 20:
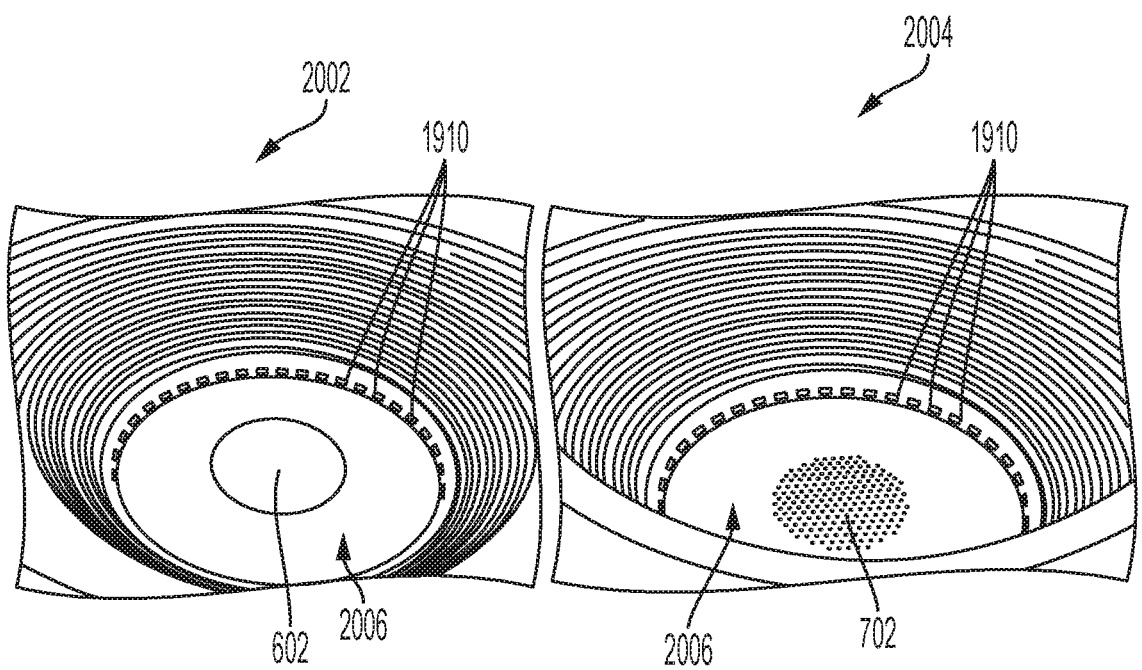
FIG. 20 depicts a perspective, underside view of examples of luminaire housings using indirect downlighting, according to certain aspects of the present disclosure.

FIG. 20 is a perspective, underside view of examples of luminaire housings 2002 and 2004 using indirect downlighting. With the light from the LEDs 1910 sufficiently directed at speaker planes (i.e., planes on which the speaker diaphragm 1904 and the speaker box 1908 reside), a reflector portion 2006 of the luminaire housings 2002 and 2004 may be flat or nearly flat. Such an arrangement may favor a decreased total luminaire depth over potential improvement in light output. In an example, the speaker box 1908 itself may not be the reflector, but a separate flat reflective element 2006 may be added over the speaker box 1908. The speaker diaphragm 1904 may optionally be hidden with the acoustic mesh 602 or a reflective material 702, as described above with respect to FIGS. 6 and 7. These elements are also illustrated in the figures below.

FIG. 21 is a sectional view of a luminaire housing 2102 including a speaker 138 and a shaped speaker box 2104 surrounding the speaker 138. The speaker box 2104 may be shaped such that a surface 2106 acts as a reflector to redirect light down and out of the luminaire housing 2102. In such an example, the speaker 138 may be mounted in the center of the shaped surface 2106 of the speaker box 2104 to provide sound, while the surrounding area acts as a reflector.

If the speaker 138 is small enough compared to the surrounding shaped surface 2106 such that the assembly provides adequate lighting performance, then the speaker 138 may maintain a typical shape of a speaker assembly. This maintains the availability of off the shelf speaker options for us in the luminaire housing 2102. Further, the speaker 138 may be made from a white or reflective material such that the speaker 138 reflects light more efficiently than black or other dark colored speakers.

In an example, the speaker 138 may also be covered by a reflective and acoustically transparent element similar to the acoustic mesh 602 and the reflective material 702 or be covered by an acoustically transparent element similar to the grill element 1002. The reflective and acoustically transparent element may be flat if the speaker is small enough relative to the reflector element, or the reflective and acoustically transparent element may be shaped so as to follow a curve of the main reflector (e.g., the shaped surface 2106 of the speaker box 2104).

As the size of a speaker 138 increases, speaker performance and sound quality may also increase. But, as a speaker 138 grows larger relative to the surrounding shaped surface 2106, the speaker 138 may perform more and more as a reflector. An example arrangement to produce a sufficiently reflective surface over the speaker 138 may include a large flat speaker with a downward facing curved covering acting as a reflective element.

In another example, to make the speaker 138 as large as possible, the shaped surface 2106 of the speaker box 2104 and a reflector covering may be removed altogether. In such an example, the speaker 138 may perform as the main downward reflective element. In one arrangement, the speaker 138 may be finished with a reflective white finish to provide a desired luminaire lighting performance. The shape of the speaker 138 may also be adjusted to sufficiently perform as a reflector while still functioning as the speaker. In one or more examples, the speaker 138 may also include a multi-speaker arrangement. That is, the speaker 138 may include multiple types of speakers when the speaker element is being used as a portion of the reflective material.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A luminaire, comprising:
    a speaker comprising a speaker diaphragm positioned at a first depth within a luminaire housing and configured to generate an audio output from the speaker diaphragm;
    a light guide positioned at a second depth within the luminaire housing different from the first depth, wherein the light guide comprises a hole aligned with the speaker diaphragm and at least the size of the speaker diaphragm, and wherein the light guide is configured to direct a light output in a direction away from the luminaire;
    a reflective component positioned at a third depth between the first depth and the second depth to cover the hole of the light guide, wherein the reflective component comprises a plurality of holes that enable airflow across the reflective component in response to the audio output from the speaker diaphragm; and
    a light source disposed at an edge of the light guide and configured to generate the light output.

2. The luminaire of claim 1, wherein the reflective component comprises a plurality of holes positioned in a reflective surface backing the light guide.

3. The luminaire of claim 1, wherein the reflective component comprises a grill element configured to receive a portion of the light output from the light guide and direct the portion of the light output away from the luminaire.

4. The luminaire of claim 1, wherein the light guide comprises a reflective surface, a diffuser, and a light guide panel positioned between the reflective surface and the diffuser.

5. The luminaire of claim 4, wherein the plurality of holes of the reflective component comprises a plurality of holes cut into the reflective surface of the light guide.

6. The luminaire of claim 1, wherein the light source comprises a plurality of light emitting diodes configured to provide the light output to the edge of the light guide, wherein the edge is perpendicular to a transmission direction of the light output from the light guide.

7. The luminaire of claim 1, wherein the light guide comprises a light guide panel, and wherein the luminaire further comprises an acoustic mesh that is reflective and acoustically transparent, wherein the acoustic mesh is positioned over the light guide panel and the hole of the light guide.

8. A luminaire, comprising:
    a speaker diaphragm positioned at a first depth within a luminaire housing and configured to generate an audio output;
    a light guide positioned at a second depth within the luminaire housing different from the first depth, wherein the light guide comprises a hole aligned with the speaker diaphragm and at least the size of the speaker diaphragm, and wherein the light guide is configured to direct a light output in a direction away from the luminaire;
    a reflective component positioned at a third depth between the first depth and the second depth to cover the hole of the light guide, wherein the reflective component comprises a plurality of holes that enable airflow across the reflective component in response to the audio output from the speaker diaphragm;
    a light source disposed at an edge of the light guide and configured to generate the light output; and
    a seal between a back-volume and a front-volume of the speaker diaphragm.

9. The luminaire of claim 8, wherein the back-volume comprises a volume of a luminaire can in which the luminaire is installed, and the front-volume comprises a space into which the audio output is transmitted.

10. The luminaire of claim 8, wherein the back-volume comprises a plenum behind a ceiling or wall in which the luminaire is installed, and the front-volume comprises a space into which the audio output is transmitted.

11. The luminaire of claim 8, wherein the seal comprises a gasket positioned between (i) the luminaire housing and (ii) a ceiling or a luminaire can in which the luminaire housing is installed.

12. The luminaire of claim 8, wherein the seal comprises a speaker box seal between the speaker diaphragm and a speaker box comprising, and wherein the speaker box comprises the back-volume of the speaker diaphragm.

13. The luminaire of claim 8, further comprising a control system, wherein the control system is configured to control the light output of the light source using a compensation function that compensates for effects of vibration from the audio output on the light output.

14. The luminaire of claim 8, wherein the light guide comprises a reflective surface, a diffuser, and a light guide panel that is positioned between the reflective surface and the diffuser.

15. A luminaire, comprising:
- a speaker comprising a speaker diaphragm positioned at a first depth within a luminaire housing and configured to generate an audio output from the speaker diaphragm;
- a reflective component positioned over the speaker diaphragm along a sound path of the audio output, wherein the reflective component comprises a plurality of holes that enable airflow across the reflective component in response to the audio output from the speaker diaphragm;
- a first light source positioned at a second depth within the luminaire housing different from the first depth, wherein the first light source is configured to generate a light output directed toward the reflective component such that a reflective surface of the reflective component reflects the light output toward a space in a direction of the sound path of the audio output; and
- a ledge configured to (i) block a view of the first light source by an occupant of the space into which the light output and the audio output are transmitted and (ii) redirect at least a portion of the light output toward the speaker diaphragm.

16. The luminaire of claim 15, wherein the luminaire is installable within a downlight can within a ceiling.

17. The luminaire of claim 15, further comprising a seal between a back-volume and a front-volume of the speaker, wherein the back-volume of the speaker comprises a volume of a luminaire can in which the luminaire is installed, and the front-volume comprises the space into which the light output and the audio output are transmitted.

18. The luminaire of claim 15, further comprising a seal between a back-volume and a front-volume of the speaker, wherein the back-volume of the speaker comprises a plenum behind a ceiling or wall in which the luminaire is installed, and the front-volume comprises the space into which the light output and the audio output are transmitted.

19. The luminaire of claim 15, further comprising:
- a baffle surrounding the speaker diaphragm; and
- a second light source positioned at a third depth of the luminaire housing different from the first depth and the second depth, wherein the first light source and the second light source are configured to generate the light output directed toward the reflective component and the baffle such that the reflective component and the baffle reflect the light output from the first light source and the second light source.

* * * * *